US010268829B2

(12) United States Patent
Roets et al.

(10) Patent No.: US 10,268,829 B2
(45) Date of Patent: Apr. 23, 2019

(54) SECURITY SYSTEMS AND METHODS BASED ON CRYPTOGRAPHIC UTILITY TOKEN INVENTORY TENURE

(71) Applicant: DRAGONCHAIN, INC., Bellevue, WA (US)

(72) Inventors: Joe Roets, Bellevue, WA (US); Paul Sonier, Bellevue, WA (US)

(73) Assignee: DRAGONCHAIN, INC., Bellevue, WA (US)

( * ) Notice: Subject to any disclaimer, the term of this patent is extended or adjusted under 35 U.S.C. 154(b) by 0 days.

(21) Appl. No.: 16/206,830

(22) Filed: Nov. 30, 2018

(65) Prior Publication Data

US 2019/0095631 A1 Mar. 28, 2019

Related U.S. Application Data

(63) Continuation-in-part of application No. 16/101,343, filed on Aug. 10, 2018, now Pat. No. 10,135,607.

(60) Provisional application No. 62/544,218, filed on Aug. 11, 2017.

(51) Int. Cl.
*G06F 21/60* (2013.01)
*G06N 7/00* (2006.01)

(52) U.S. Cl.
CPC ........... *G06F 21/602* (2013.01); *G06N 7/005* (2013.01)

(58) Field of Classification Search
CPC ............................. G06F 21/602; G06N 7/005
See application file for complete search history.

(56) References Cited

U.S. PATENT DOCUMENTS

| 9,569,439 | B2 | 2/2017 | Davis et al. |
| 9,569,771 | B2 | 2/2017 | Lesavich et al. |
| 9,646,029 | B1 | 5/2017 | Baird, I |
| 9,672,499 | B2 | 6/2017 | Yang et al. |
| 9,747,586 | B1 | 8/2017 | Frolov et al. |
| 10,050,959 | B2 | 8/2018 | Soon-Shiong et al. |
| 10,063,568 | B1 | 8/2018 | Ford et al. |
| 10,068,397 | B2 | 9/2018 | Day et al. |
| 10,121,025 | B1 | 11/2018 | Rice |
| 2010/0332336 | A9 | 12/2010 | Quigley et al. |
| 2012/0020476 | A1 | 1/2012 | Billet et al. |
| 2012/0095908 | A1 | 4/2012 | Barrie et al. |
| 2013/0061288 | A1 | 3/2013 | Paim |
| 2016/0260095 | A1 | 9/2016 | Ford |
| 2017/0109638 | A1 | 4/2017 | Marcu et al. |

(Continued)

OTHER PUBLICATIONS

A NEO Way to Dragonchain Connecting ERC20 token projects with NEP-5 token projects, such as Biocrypt. May 16, 2018.

(Continued)

*Primary Examiner* — Nelson Giddins
(74) *Attorney, Agent, or Firm* — AEON Law, PLLC; Adam L. K. Philipp; Jonathan E. Olson

(57) ABSTRACT

Security systems and methods are disclosed that associate several human entities each with a corresponding cryptographic utility token inventory and trustworthiness indication. The trustworthiness indications each shift each at a rate substantially correlating with its corresponding cryptographic utility token inventory so as to allow different entities to become trusted and untrusted over time. This triggers automatic privilege modifications that enhance security within a networked community invested in cryptographic utility tokens.

17 Claims, 19 Drawing Sheets

(56) References Cited

U.S. PATENT DOCUMENTS

| | | |
|---|---|---|
| 2017/0109639 A1 | 4/2017 | Marcu et al. |
| 2017/0109668 A1 | 4/2017 | Marcu et al. |
| 2017/0116693 A1 | 4/2017 | Rae et al. |
| 2017/0287090 A1 | 10/2017 | Hunn et al. |
| 2017/0364698 A1 | 12/2017 | Goldfarb et al. |
| 2018/0097841 A1 | 4/2018 | Stolarz et al. |
| 2018/0129955 A1 | 5/2018 | Saxena et al. |
| 2018/0157825 A1 | 6/2018 | Eksten et al. |
| 2018/0167198 A1 | 6/2018 | Muller et al. |
| 2018/0183606 A1 | 6/2018 | High et al. |
| 2018/0183687 A1 | 6/2018 | Dementev et al. |
| 2018/0247191 A1* | 8/2018 | Katz .................. G06N 3/08 |
| 2018/0300476 A1 | 10/2018 | Guillama et al. |
| 2018/0332070 A1 | 11/2018 | Ford et al. |
| 2018/0332072 A1 | 11/2018 | Ford et al. |
| 2018/0337769 A1* | 11/2018 | Gleichauf ............ H04L 9/3239 |

OTHER PUBLICATIONS

Dragonchain Architecture Description Version 3, Joe Roets, Nov. 2016.
Dragonchain Business Summary, Version 5. Sep, 2017.
Hyperledger Caliper Readme.
Italian Stock Exchange to Develop Hyperledger-Based Blockchain Shares Platform by William Suberg, Jul. 19, 2017 https://cointelegraph.com/news/blockshow-announces-blockshow-americas-2018-conference-in-las-vegas-august-20-21.
Project Caliper Proposal.
Disney Dragonchain—Blockchain Use Cases.

\* cited by examiner

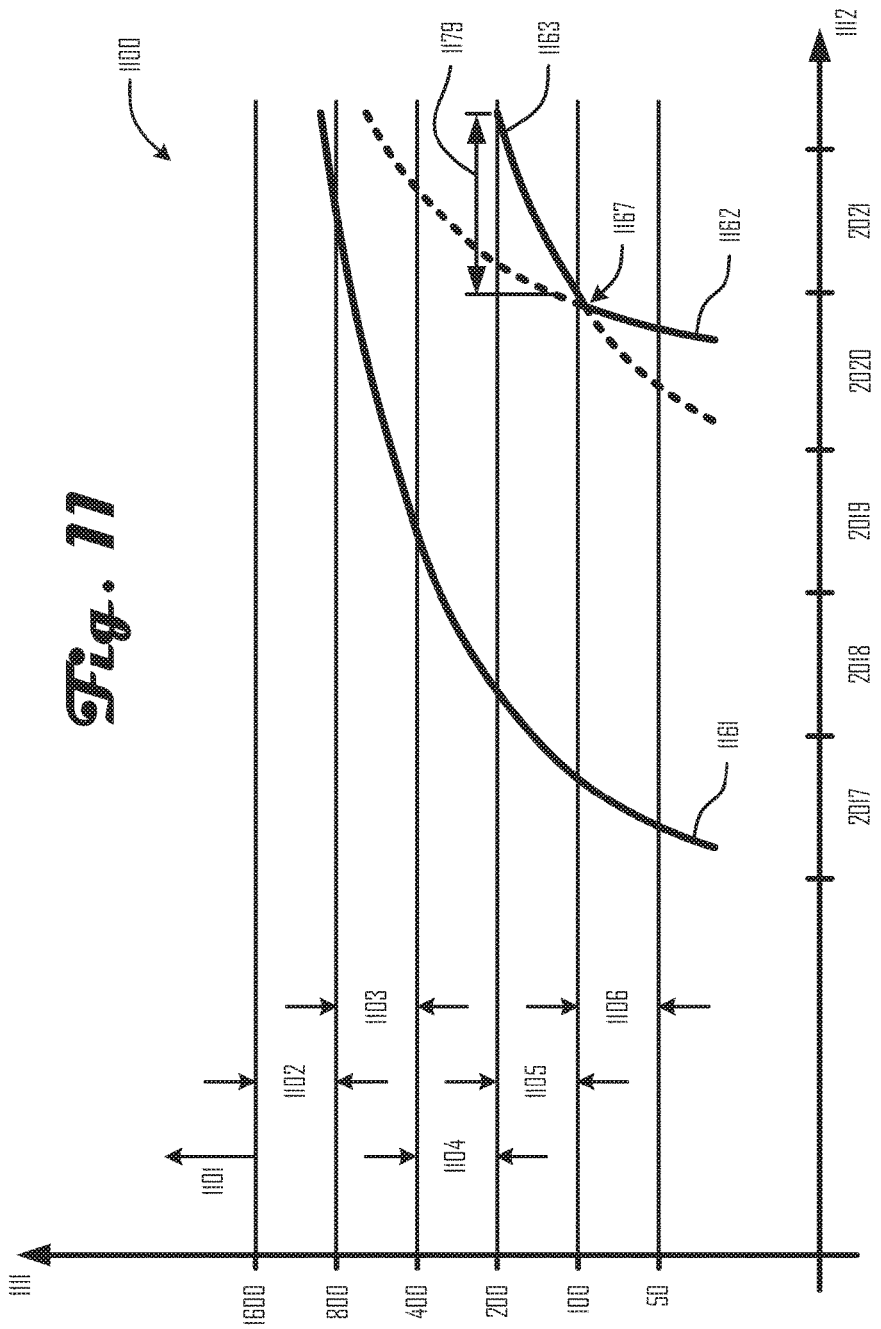

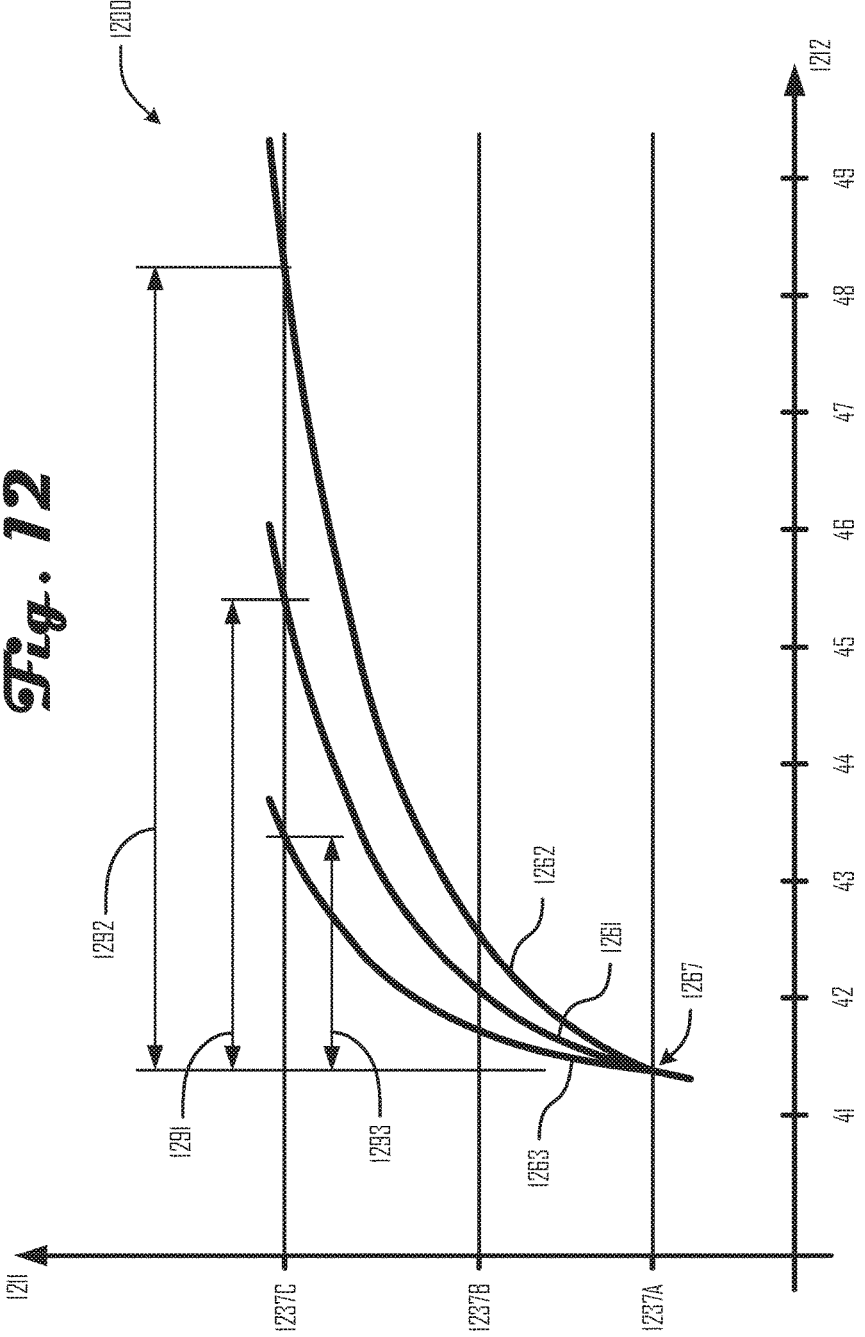

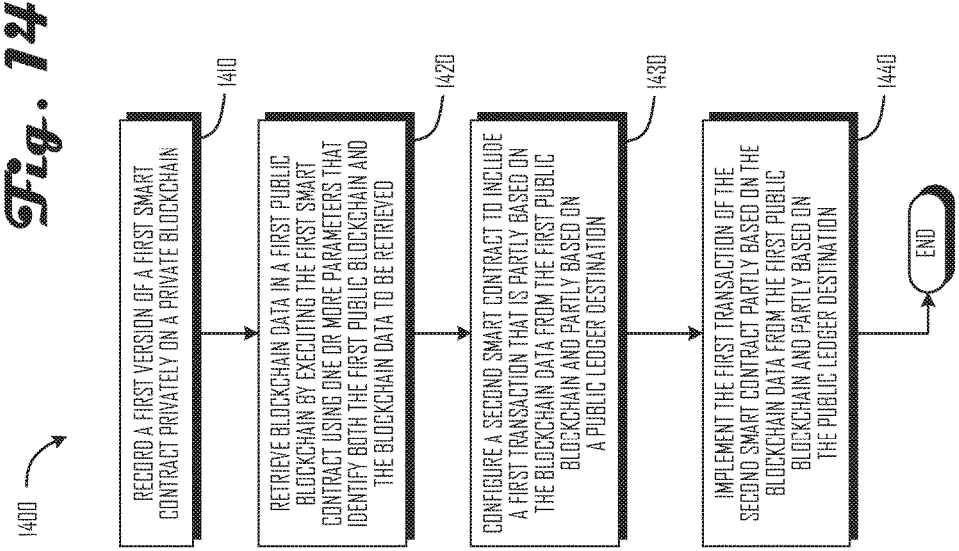
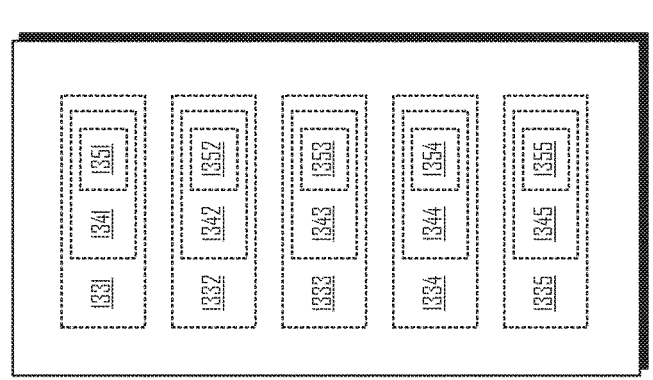

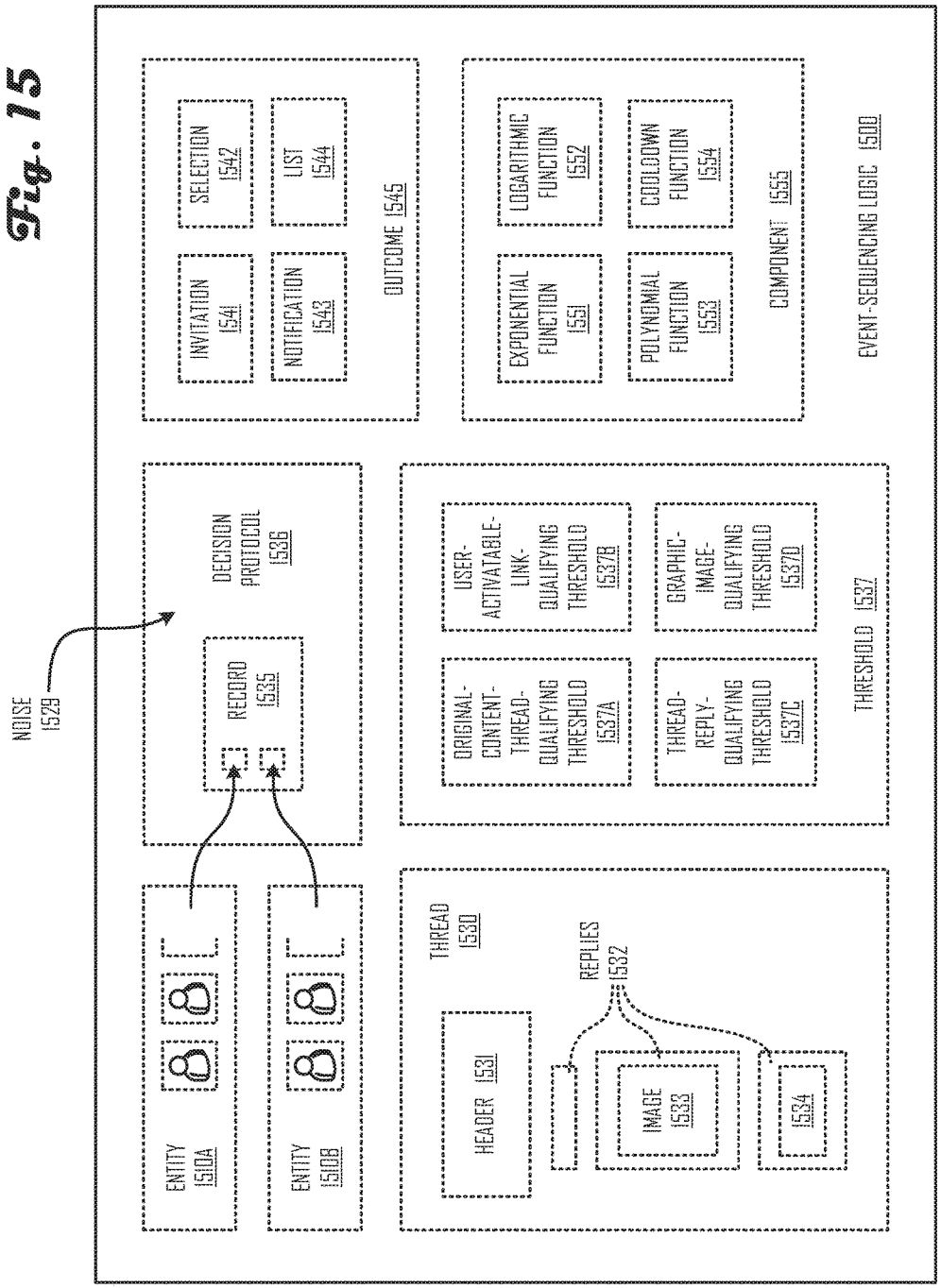

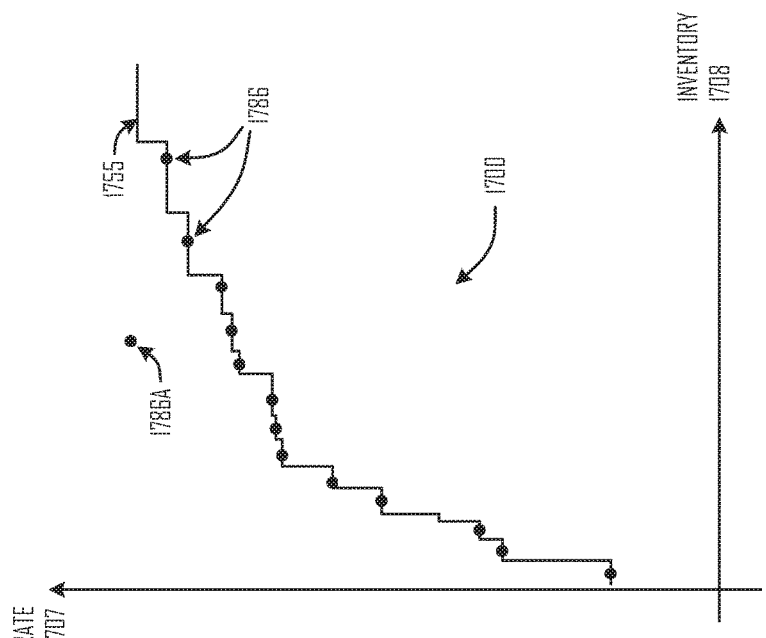
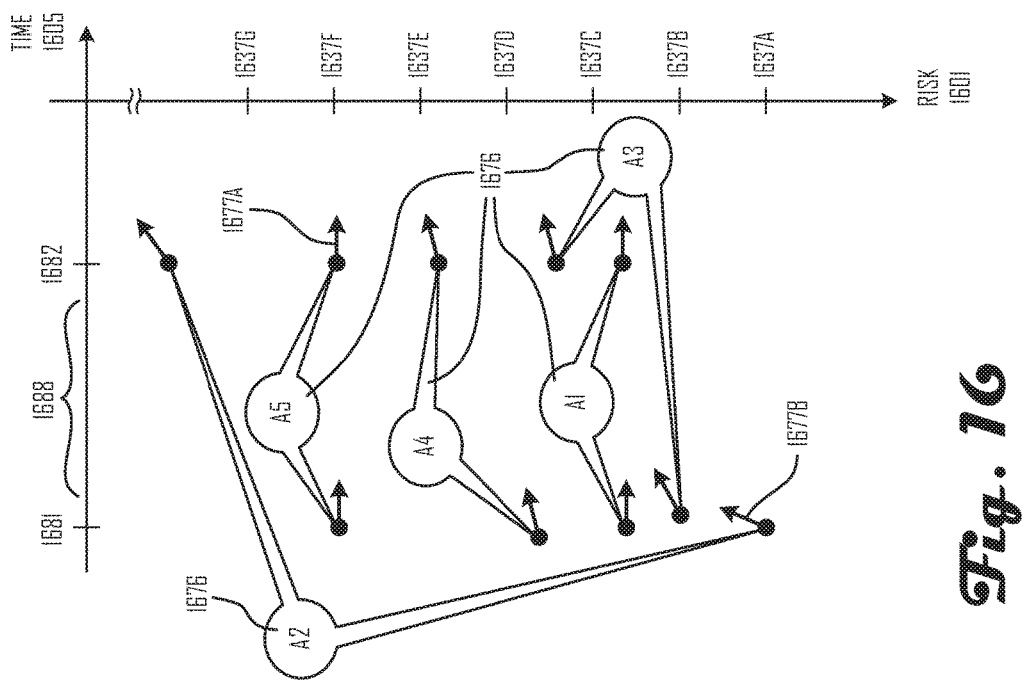

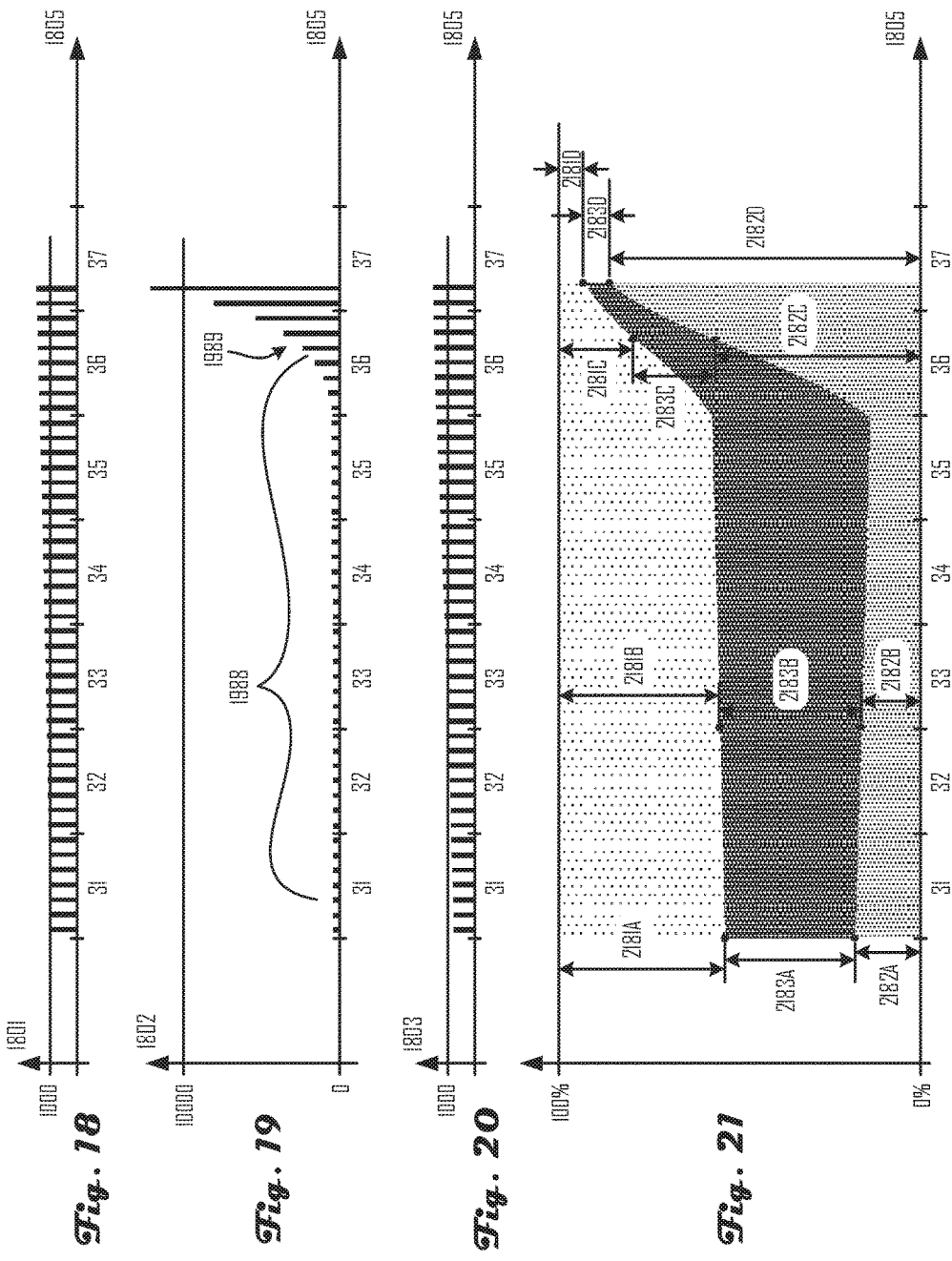

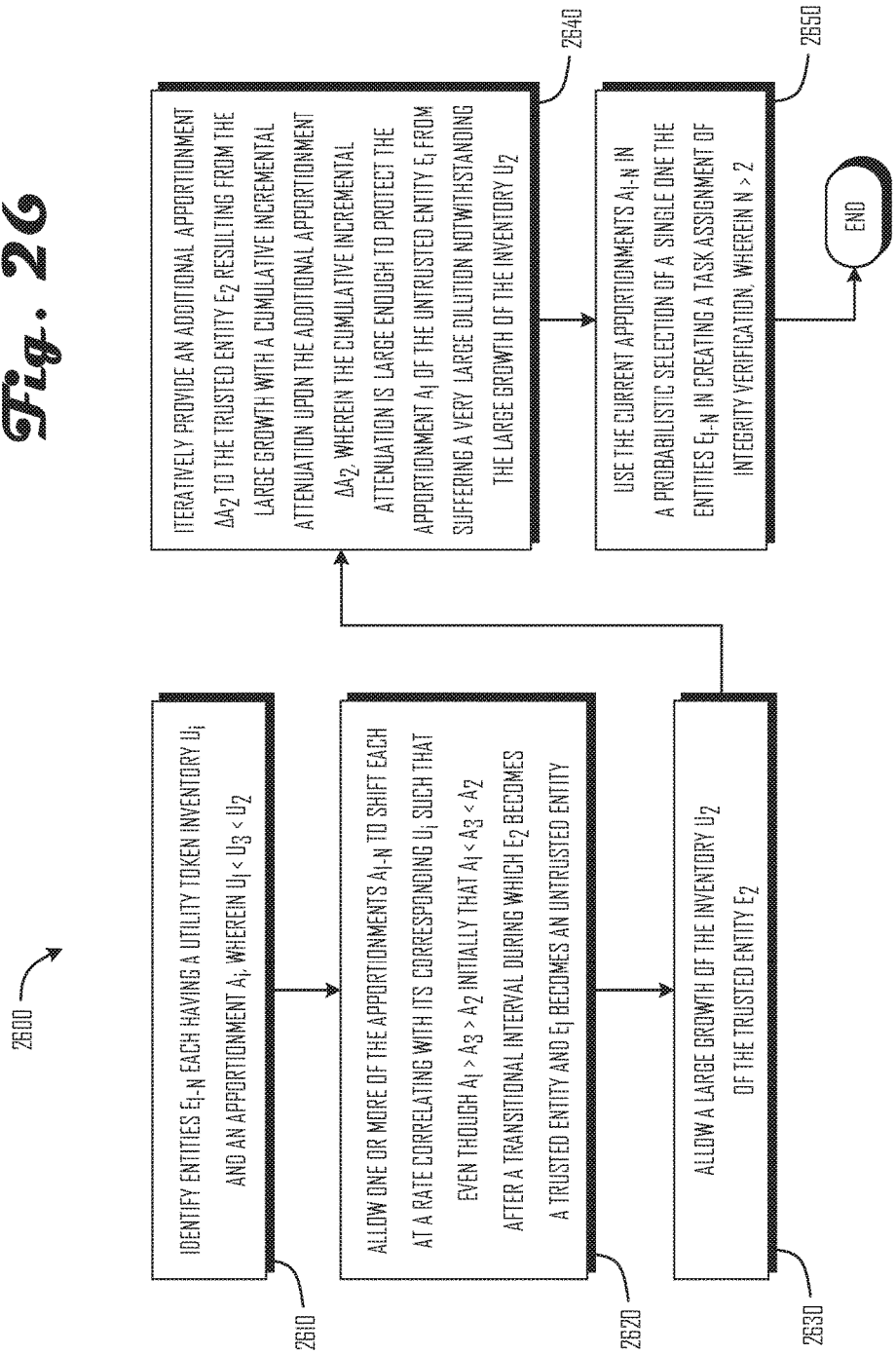

SECURITY SYSTEMS AND METHODS BASED ON CRYPTOGRAPHIC UTILITY TOKEN INVENTORY TENURE

RELATED APPLICATIONS

This application claims the benefit of U.S. Prov. App. No. 62/544,218 ("Tokenized Micro-Licenses and Smart Contracts") filed 11 Aug. 2017, of U.S. Pat. No. 10,135,607 ("Distributed Ledger Interaction Systems and Methods"), and of U.S. application Ser. No. 16/101,343 ("Distributed Ledger Interaction Systems and Methods") all of which are incorporated by reference herein in their entirety for all purposes.

BACKGROUND

Before the 1990s, many software makers sold licenses to use a particular version of a software product. With the connectivity of the Internet, software could be updated readily by the vendor, and many software products were licensed for all updates for a major version of the product. That is, the user would have license rights to obtain and use all updates to a product until a new, major version was released. After a new release, they could continue to use the old and unsupported version or purchase an upgrade. This offered added flexibility to the consumer and vendor. The vendor could make much needed updates to fix bugs found after release and provide non-major upgrades. The consumer would get some level of new value in minor version of the product and also physically held the software to use at any time in the future. Some examples of the use of the version-based licensing model are Microsoft Windows 3.1 and Adobe Photoshop 7.0.

In the 1990s and 2000s, many software vendors began to use the approaching ubiquity of the Internet to provide subscription-based licensing, wherein the consumer pays on a time basis for access to software. In this model, the user will typically not hold the software or run it on a local machine. Instead, the software is managed and executed on centrally managed hardware by the vendor. This allows for very simple updates to the software in place in a consistent manner and will generally lower maintenance cost to the consumer and vendor. The vendor can control access to the services as welt and can provide the ability to provide feature driven pricing models for the services and particular advanced features. The negative for the consumer is generally in the loss of right and possession of the software. The model generally represents the shift from licensing rights to own the purchased software and possess it physically to a utility focused right. That is, the consumer has a right to access the service or its underlying application software interfaces (API). The consumer never possesses the software or its executable code. If the consumer stops paying for the subscription, access is withdrawn and is unavailable. Among other issues, this model did not standardize or solve the resulting issue with ownership of the consumers' data on the system. That is, when using a subscription license, how does a user retain control of the data produced or held in the subscription-based license system? If the system stores the data in the vendor's infrastructure (very typical due to efficiency), then the consumer will need some ability to extract their data from the vendor's storage. Some examples of the use of the subscription licensing model are Google GSuite, Microsoft Office 365, and Adobe Creative Cloud.

For these and many other security-related or efficiency-related aspects of distributed ledgers, cryptographic utility tokens, and devices via which they operate, a variety of technological improvements are presented below.

BRIEF DESCRIPTION OF THE DRAWINGS

FIG. 11 is a semi-log plot showing how trustworthiness can increase over time in which one or more improved vetting technologies may be incorporated.

FIG. 12 is another plot showing how trustworthiness can increase over time in which one or more improved vetting technologies may be incorporated.

FIG. 13 depicts special-purpose transistor-based circuitry in which one or more improved technologies may be incorporated.

FIG. 14 depicts an operational flow in which one or more improved technologies may be incorporated.

FIG. 15 depicts event-sequencing logic including one or more decision protocols in which one or more improved technologies may be incorporated.

FIG. 16 depicts relative trustworthiness indications of several entities varying across an interval of time in which one or more improved technologies may be manifested.

FIG. 17 depicts a transfer function generally indicating a positive correlation between an effective rate/steepness of several trajectories and a corresponding cryptographic utility token inventory each belonging to a respective entity.

FIG. 18 depicts an apportionment to an entity that increases in trust over a period of several weeks to describe a context in which such growth is so slow that the entity becomes untrusted in this period.

FIG. 19 depicts an apportionment to an initially untrusted entity that increases in trust over the same period of several weeks to describe how such growth is so fast that the entity becomes trusted in this period.

FIG. 20 depicts an apportionment to an intermediate entity that increases in trust moderately to exemplify how such an entity can be neither trusted nor untrusted both before and after the same exemplary period of several weeks.

FIG. 21 depicts time-varying normalized apportionments reflecting the raw apportionments depicted in FIGS. 18-20 over the same period of several weeks.

FIG. 26 depicts another operational flow in which one or more improved technologies may be incorporated for implementing fraud-resistant task delegation.

DETAILED DESCRIPTION

Figure 1:
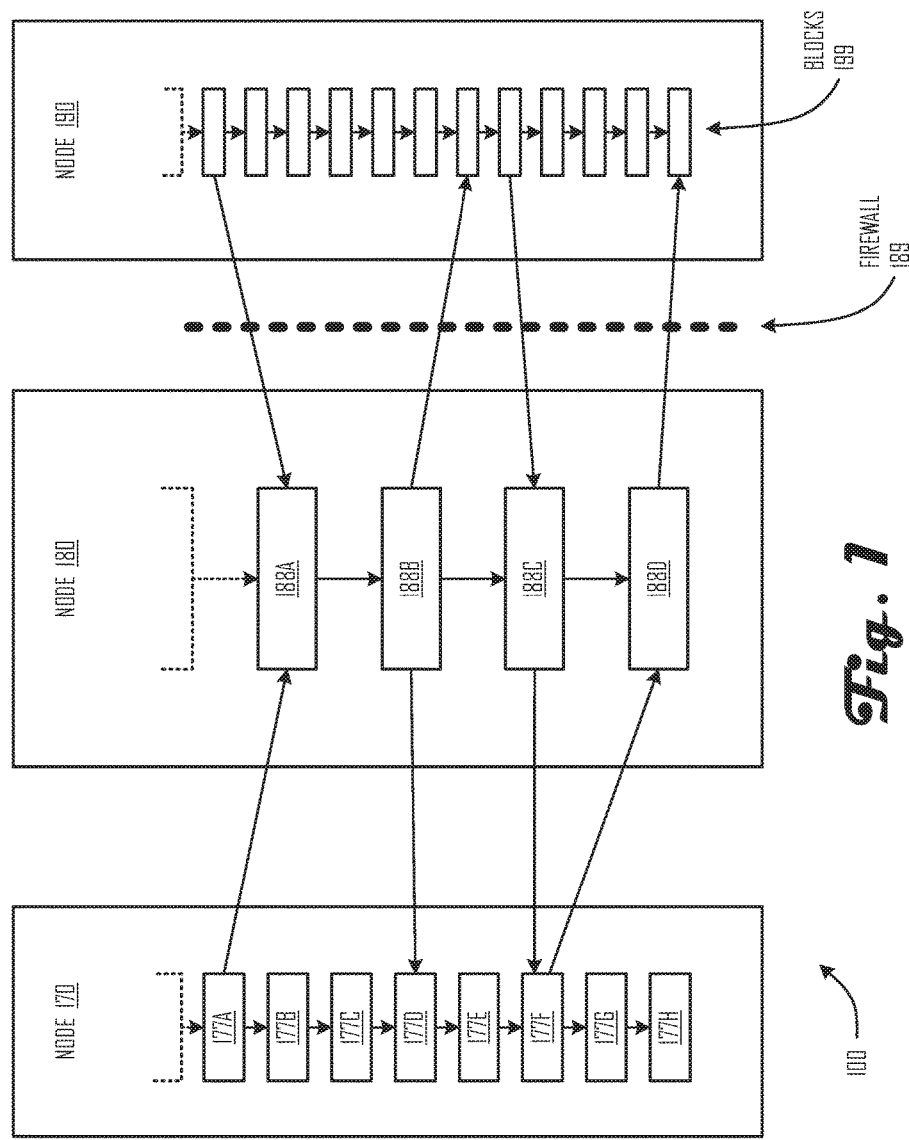
FIG. 1 schematically illustrates a system in which respective distributed ledger nodes interact according to one or more improved technologies.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers, computer servers and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Above," "accelerating," "achieved," "aggregate," "any," "application-type," "application-specific," "automatic," "availability," "based on," "because," "complete," "comprising," "conditional," "configured," "correlating," "current," "decelerating," "decreasing," "digital," "directly," "distributed," "executed," "first," "higher," "hybrid," "implemented," "inalterable," "included," "indicated," "integrated," "malicious," "monotonic," "more," "mutually," "negatively," "of," "otherwise," "particular," "partly," "positively," "prior," "private," "public," "received," "remote," "requester-specified," "responsive," "second," "sequencing," "shorter," "signaling," "single," "smart," "so as," "special-purpose," "specific," "stepwise," "suitability," "techniques," "temporal," "third," "through," "transistor-based," "undue," "updated," "upon," "utility," "version-controlled," "via," "without," or other such descriptors herein are used in their normal yes-or-no sense, not merely as terms of degree, unless context dictates otherwise. As used herein "inventory-type" instruction sets are those that primarily implement asset transfers or verifications thereof, moving quantities among accounts rather than changing them. As used herein "data transformative" instruction sets are those that primarily implement other kinds of computations. Although one of these types of instruction sets may invoke the other as a subroutine, only very rarely is a single code component of instructions a true hybrid.

In light of the present disclosure those skilled in the art will understand from context what is meant by "remote" and by other such positional descriptors used herein. Likewise they will understand what is meant by "partly based" or other such descriptions of dependent computational variables/signals. "On-chain" refers to (permanent) inclusion in a blockchain, whether or not such content is public or transparent. "On-list" encompasses not only on-chain but also other content linked and effectively rendered immutable using cryptography (e.g. in a consensus-based data verification). In an implementation that includes "on-list" content (e.g. a blockchain or tangle) as described below, "off-list" refers to content elements (e.g. an in-app account ledger) that have yet to be included "on-list." A "batch" data distribution (broadcast) is one in which data is directed to numerous recipients within a limited time (e.g. less than 24 hours) after a triggering event (e.g. an administrator action or weekly trigger time). "Numerous" as used herein refers to more than one dozen. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

As used herein values are "apportionments" if they quantify reputation, risk, trustworthiness, or similar attributes of respective entities with a scalar magnitude so as to facilitate relative ranking therebetween. This may include cardinal numbers but not ordinal rankings insofar that the latter are already ranked.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 schematically illustrates a system 100 in which respective distributed ledger nodes 170, 180, 190 interact. Each node primarily include a blockchain or other distributed ledger, each occasionally progressing downward with the addition of a new block. As shown node 170 includes an oldest block 177A (built upon one or more predecessor blocks), a newest block 177H, and other blocks 177B-G between them. Node 180 likewise includes an oldest block 188A, a newest block 188D, and other blocks 188B-C between them. Node 190 likewise includes a chain of blocks. As further described below, node 180 has been constructed by a series of interactions with these other nodes 170, 190. One or more smart contracts of node 180 (see FIG. 6) read one or more elements from block 177A and from a particular one of the blocks 199 of node 190, combining the elements and recording the result in block 188A. Likewise one or more smart contracts provided one or more elements of block 188B to be recorded or otherwise reflected in block 177D and in a later one of the blocks 199 of node 190.

Thereafter one or more elements of the then-newest block 199 of node 190 was read and used in generating block 188C, one or more elements of which were provided for use in node 170. That use allowed block 177F to be recorded, and one or more elements (e.g. transactions) thereof was recorded in block 188D and relayed to the now-newest block 199 of node 190. Insofar that smart contracts or other software agents may be executing at any or all of these nodes 170, 180, 190, a firewall 189 may be used to protect node 180 from pernicious code components or other forms of intrusion (e.g. from node 190). To guard against other forms of attack (e.g. from visitors), additional constraints may be imposed by one or more servers (e.g. of a network containing a private or hybrid public/private node 180).

As used herein, a plain reference numeral (e.g. like 177) may refer generally to a member of a class of items (e.g. like ledger blocks) exemplified with a hybrid numeral (e.g. like 177A) and it will be understood that every item identified with a hybrid numeral is also an exemplar of the class. Moreover although a reference numeral shared between figures refers to the same item, most figures depict respective embodiments.

Figure 2:
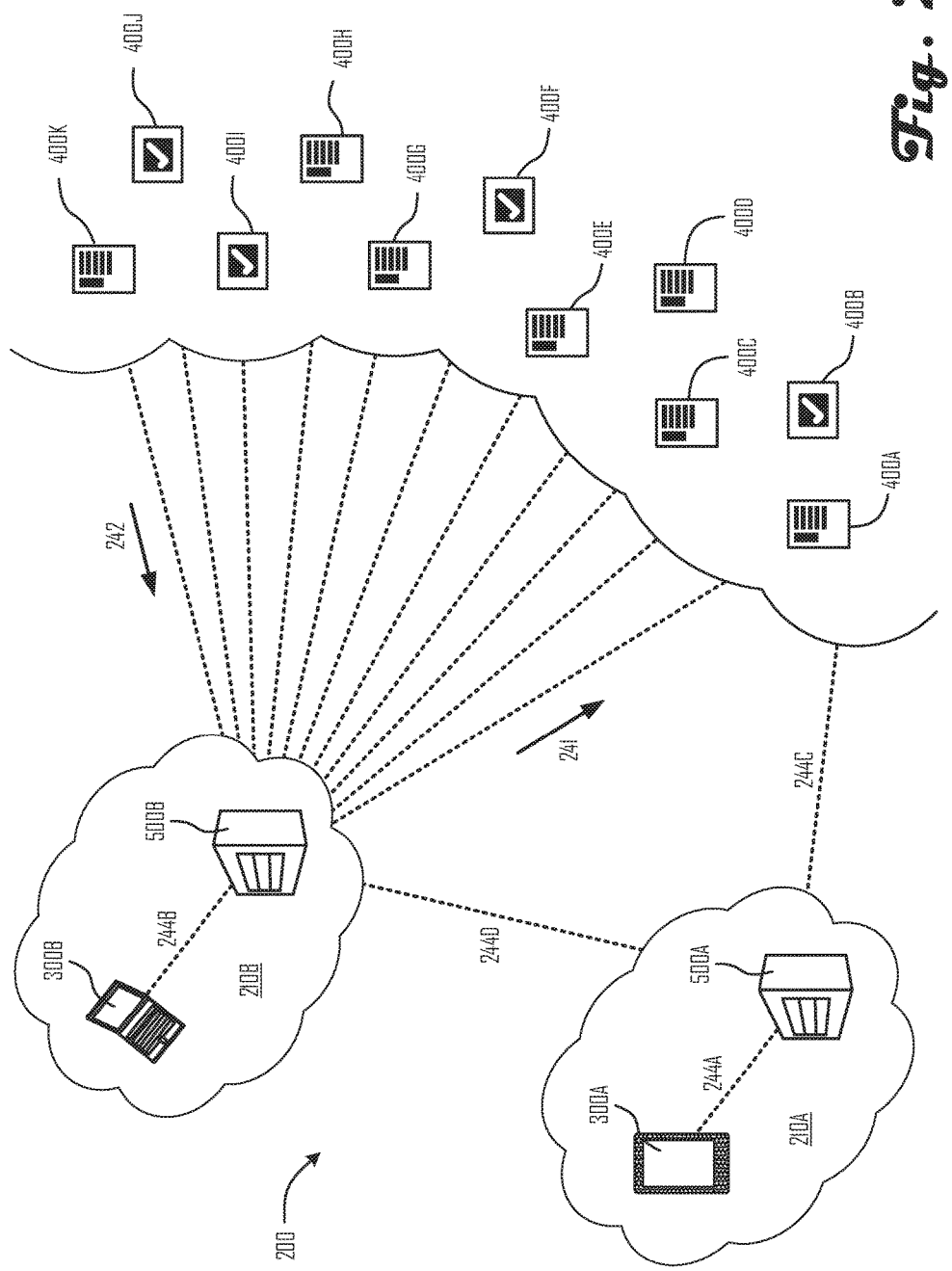
FIG. 2 schematically illustrates a system in which respective users or other entities interact with one another and with participating mining rigs or similar distributed devices in which one or more improved technologies may be incorporated.

FIG. 2 schematically illustrates a system 200 in which respective entities 210A-B interact with one another and with participating mining rigs 400K or similar distributed devices 400A-J many of which are, at various times, able to implement a transaction 241 or confirm an asset transfer or other occurrence as described below (e.g. by confirmations 242). In some variants a private entity 210A comprises one or more node management servers 500A that interact with one or more client devices 300A thereof (e.g. via respective instances of linkage 244A). Likewise a public or collective entity 210B comprises one or more node management servers 500B that interact with one or more client devices 300B thereof (e.g. via respective instances of linkage 244B). In some instances (e.g. in response to interactions via linkages 244C-D) the entities 210A-B may cooperate so that updates (e.g. indicia of dispensations, distributed ledger recordations, or other events) to values maintained at (one or more instances of) server 500B are received and so that adequately timely confirmations to those updates can occur in a decentralized fashion. In an instance where node 170 is distributed across multiple servers 500B in a proof-of-work architecture, for example, numerous proof-of-work blockchain nodes 400A, 400C, 400D, 400E, 400G, 400H, 400K (e.g. each implementing a mining rig) may validate changes to node 180 (e.g. by correctly identifying which block 177H was added last) so as to maintain or rebuild consensus. Alternatively or additionally, such consensus may be maintained or rebuilt using numerous (proof-of-stake or other) secure blockchain nodes 400B, 400F, 400I, 400J not configured as a mining rig may validate changes to node 180 in other blockchain proof architectures currently in public use.

Figure 3:
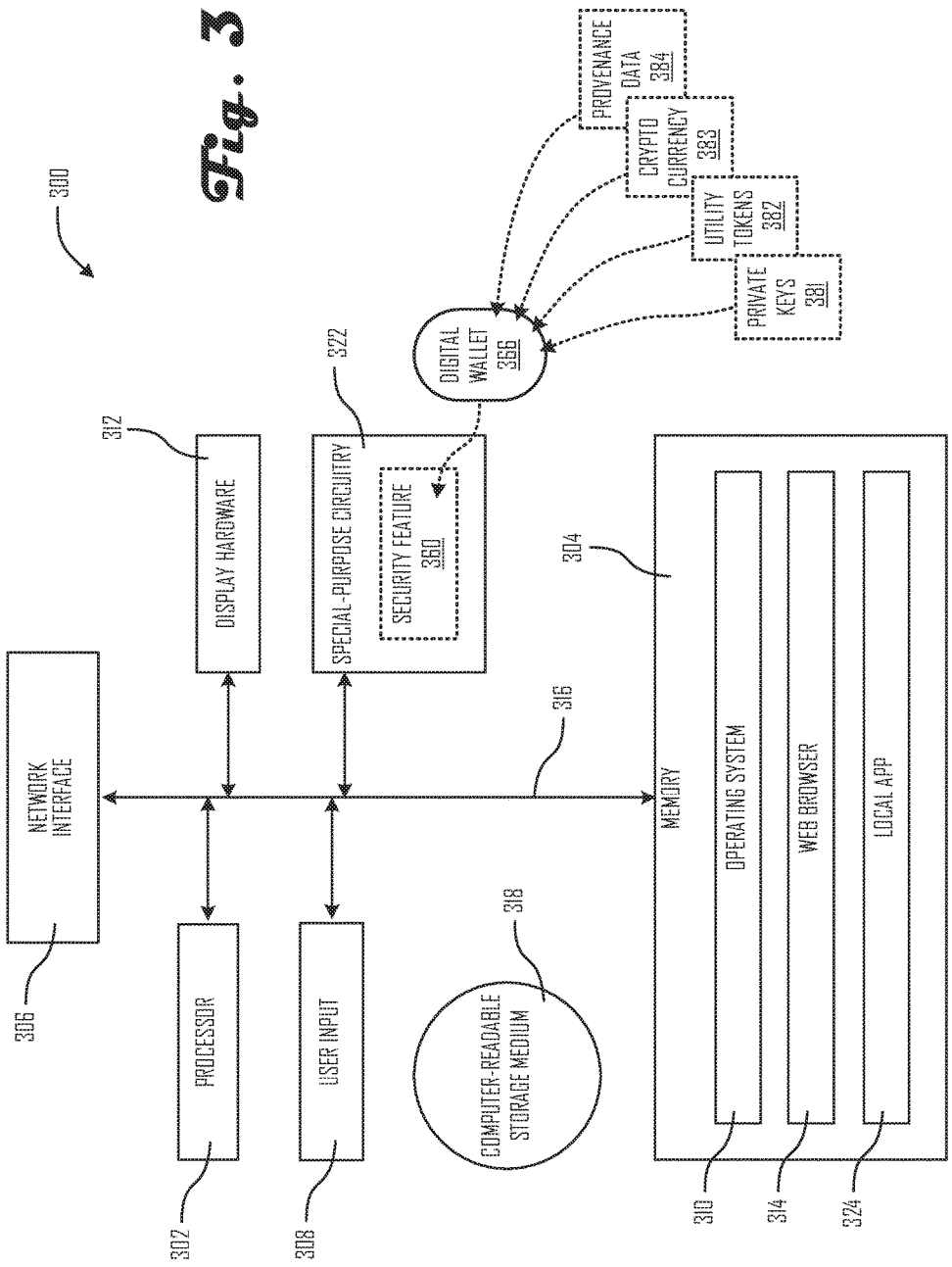
FIG. 3 depicts a client device in which one or more improved technologies may be incorporated.

Referring now to FIG. 3, there is shown a client device 300 in which one or more technologies may be implemented. Device 300 may include one or more instances of processors 302, memory 304, user inputs 308, and display hardware 312 all interconnected along with the network interface 306 via a bus 316. One or more network interfaces 306 allow device 300 to connect via the Internet or other networks to or within entities 210 of FIG. 2). Memory 304 generally comprises a random access memory ("RAM"), a read only memory ("ROM"), and a permanent mass storage device, such as a disk drive.

Memory 304 may contain one or more instances of operating systems 310, web browsers 314, and local apps 324. These and other software components may be loaded from a non-transitory computer readable storage medium 318 into memory 304 of the client device 300 using a drive mechanism (not shown) associated with a non-transitory computer readable storage medium 318, such as a floppy disc, tape, DVD/CD-ROM drive, flash card, memory card, or the like. In some embodiments, software components may also be loaded via the network interface 306, rather than via a computer readable storage medium 318. Special-purpose circuitry 322 may, in some variants, include some or all of the event-sequencing logic described below (e.g. in a peer-to-peer implementation) and one or more security features 360 (e.g. a fob or similar security apparatus).

In some contexts security feature 360 may implement or otherwise interact with a removable or other digital wallet 366. Such wallets may (optionally) each include one or more instances of private keys 381, of utility tokens 382, of crypto currency 383, of provenance data 384, or of device-executable code snippets (e.g. smart contracts) or the like as described below. In some embodiments client device 300 may include many more components than those shown in FIG. 3, but it is not necessary that all conventional components be shown in order to disclose an illustrative embodiment.

Figure 4:
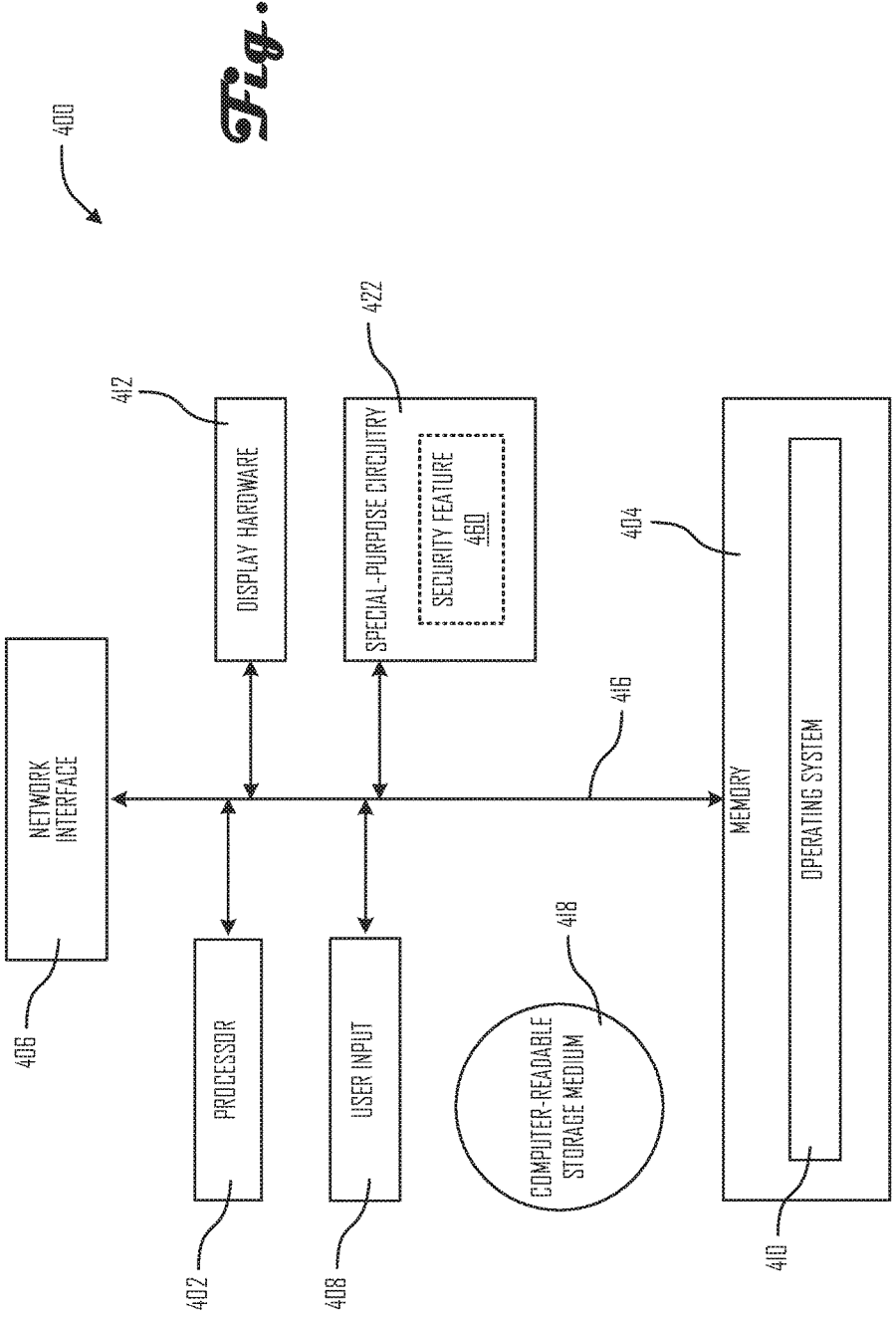
FIG. 4 depicts a distributed ledger verification device in which one or more improved technologies may be incorporated.

Referring now to FIG. 4, there is shown a distributed ledger verification device 400 like those of FIG. 2. Device 400 may include one or more instances of processors 402, memory 404, user inputs 408, and display hardware 412 all interconnected along with the network interface 406 via a bus 416. One or more network interfaces 406 allow device 400 to connect via the Internet or other networks to or within entities 210 of FIG. 2). Memory 404 generally comprises a random access memory ("RAM"), a read only memory ("ROM"), and a permanent mass storage device, such as a disk drive.

Memory 404 may contain one or more instances of operating systems 410 and special-purpose software. These and other software components may be loaded from a non-transitory computer readable storage medium 418 into memory 404 of the client device 400 using a drive mechanism (not shown) associated with a non-transitory computer readable storage medium 418, such as a floppy disc, tape, DVD/CD-ROM drive, flash card, memory card, or the like. In some embodiments, software components may also be loaded via the network interface 406, rather than via a computer readable storage medium 418. Special-purpose circuitry 422 may, in some variants, include some or all of the event-sequencing logic described below (e.g. in a peer-to-peer implementation) and one or more security features 460 (e.g. specially configured graphics processors or trusted entity private keys). In some embodiments client device 400 may include many more components than those shown in FIG. 4, but it is not necessary that all conventional components be shown in order to disclose an illustrative embodiment.

Figure 5:
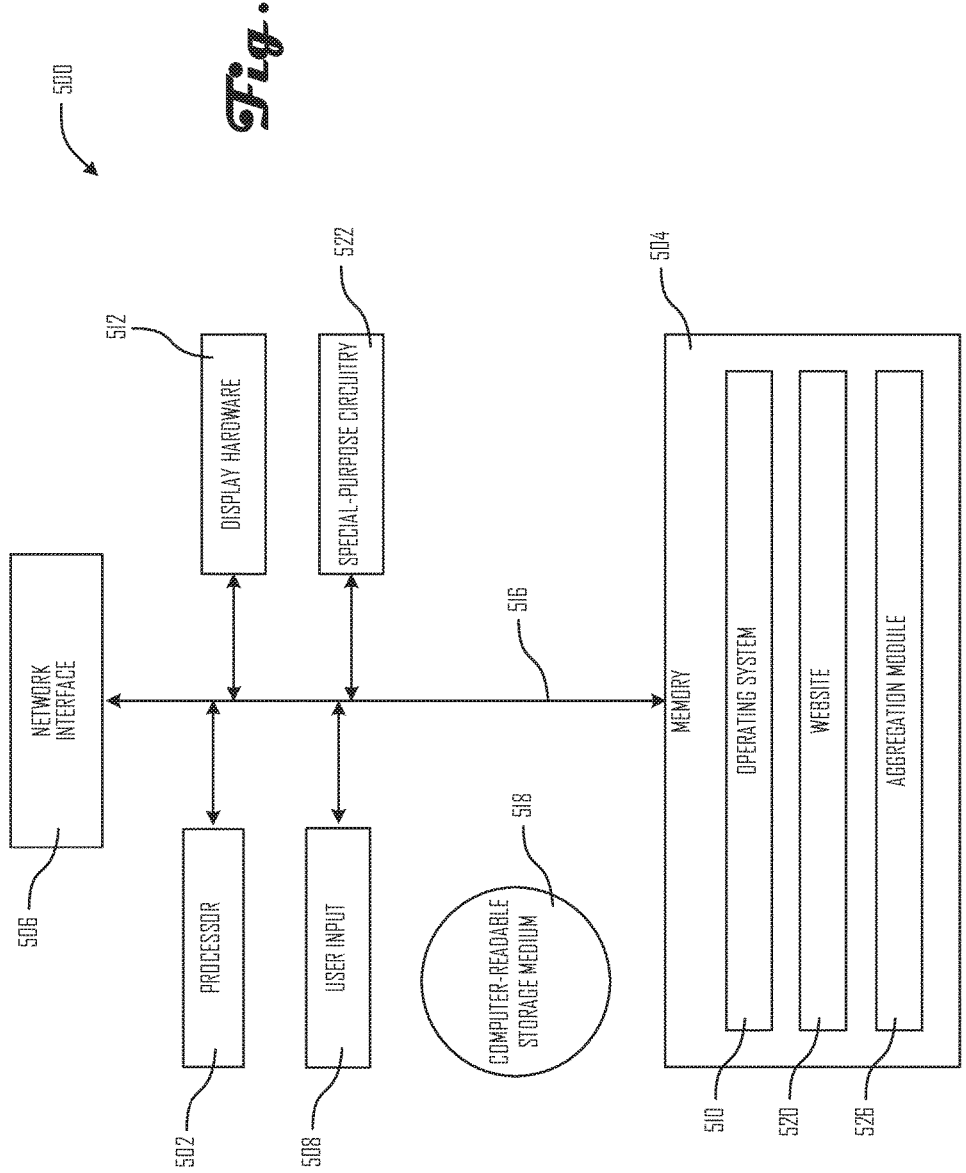
FIG. 5 depicts a server in which one or more improved technologies may be incorporated.

Referring now to FIG. 5, there is shown an exemplary server 500 like those of FIG. 2. Device 500 may include one or more instances of processors 502, memory 504, user inputs 508, and display hardware 512 all interconnected along with the network interface 506 via a bus 516. One or more network interfaces 506 allow device 500 to connect via the Internet or other networks to or within entities 210 of FIG. 2). Memory 504 generally comprises a random access memory ("RAM"), a read only memory ("ROM"), and a permanent mass storage device, such as a disk drive.

Memory 504 may contain one or more instances of operating systems 510, hosted websites 520, and aggregation modules 526. These and other software components may be loaded from a non-transitory computer readable storage medium 518 into memory 504 of the client device 500 using a drive mechanism (not shown) associated with a non-transitory computer readable storage medium 518, such as a floppy disc, tape, DVD/CD-ROM drive, flash card, memory card, or the like. In some embodiments, software components may also be loaded via the network interface 506, rather than via a computer readable storage medium 518. Special-purpose circuitry 522 may, in some variants, include some or all of the event-sequencing logic described below (e.g. in a peer-to-peer implementation) and one or more security features 560 (e.g. a firewall 189). In some embodiments client device 500 may include many more components than those shown in FIG. 5, but it is not necessary that all conventional components be shown in order to disclose an illustrative embodiment.

Figure 6:
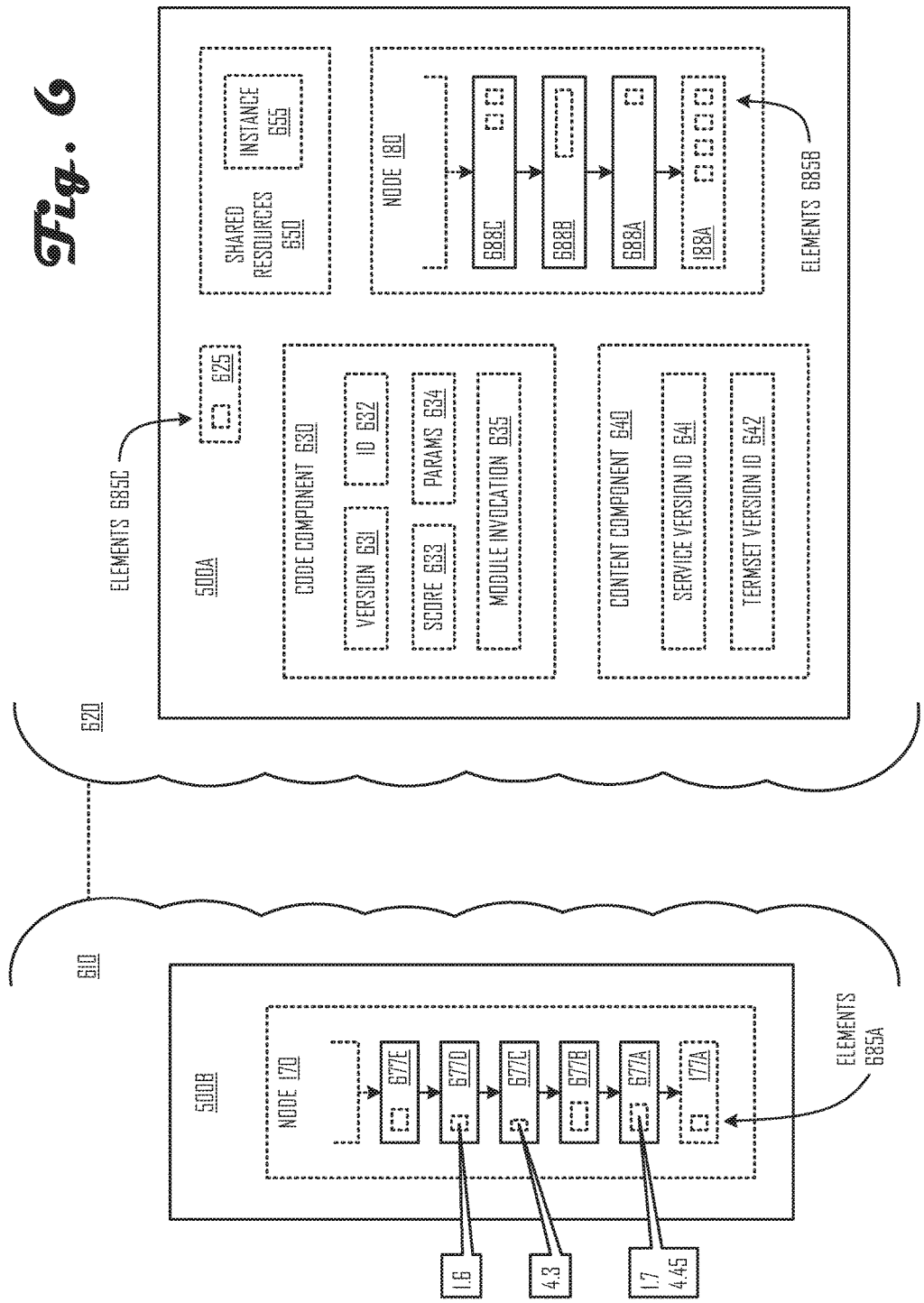
FIG. 6 depicts an earlier state of (a variant of) the system of FIG. 1.

FIG. 6 depicts an earlier state of (a variant of) the system 100 of FIG. 1, a configuration in which one or more servers 500A of a private or semi-private network (e.g. coinciding with entity 210A) interact with one or more servers 500B of a public or semi-public network 610 (e.g. coinciding with entity 210B). A (blockchain or other) distributed ledger node 170 shows the oldest block 177A thereof in FIG. 1 together with several of the preceding blocks 677A-E of the node. Most or all of these contain various elements 685A of interest in a permanent, public, verified, distributed arrangement. Likewise a private or other proprietary ledger node 180 shows the oldest block 188A thereof in FIG. 1 together with several of the preceding blocks 688A-C of the node. Most or all of these contain various elements 685B of interest in a permanent, secure arrangement that is at least partly accessible externally.

Such elements 685B may include one or more instances of smart contracts 625 or other code components 630 and in some variants may also include other content components 640 or shared resources 650 (or both) on-list as described herein. Such code components 630 may include one or more instances of routine or subroutine versions 631 (e.g. of device-executable code or source code thereof); of smart contract or other identifiers 632 (see FIG. 8); of trustworthiness-indicative or other scores 633 (e.g. pertaining to a code component 630 or an entity 210 that provides it); of Representation State Transfer protocol or other parameters 634; of timestamped (provenance data describing) module invocations 635 associated with such parameters 634; or of other data objects relating to executable code (e.g. transactions or other elements 685C of a smart contract 625) immutably recorded on chain. Such content components 640 may include one or more instances of service version identifiers 641 (e.g. identifying a most up-to-date version 631 of a code component 630), termset version identifiers 642 (e.g. identifying license terms or conditions in effect for a particular user at or before an execution as described herein), or other such timestamped data indelibly recorded in a ledger node 170, 180, 190. Such shared resources 650 may include built-in code (built-in subroutines called by some smart contracts 625) or a local instance 655 of a complete copy of a public ledger node 170, 190.

For example as described below, node 170 may reflect timestamped transitions from a service version identifier 641 of 1.5 just before block 677D to a service version identifier 641 of 1.6 in block 677D and several minutes later to a service version identifier 641 of 1.7 in block 677A as shown. Such service version identifiers 641 may pertain to all executions of a given module type (e.g. see FIG. 8) by a particular entity therebetween, for example. This can occur, for example, in a context in which a service type provenance would otherwise not be recorded on-chain without having access to the executions of the corresponding code component 630.

Likewise as further described below, node 170 may reflect timestamped transitions from a termset version identifier 642 of 4.2 just before block 677C to a termset version identifier 642 of 4.3 in block 677C and several minutes later to a termset version identifier 642 of 4.45 in block 677A as shown. Such transitions of termset version identifiers 642 may affect any and all executions of a given module type therebetween, for example, stating what priority will be applied or how utility tokens will be expended for the invocation of such execution. This can occur, for example, in a context in which public consensus could not otherwise be reached as to termset provenance (i.e. which license terms and conditions were in effect at the time of a particular execution of a code component).

Figure 7:
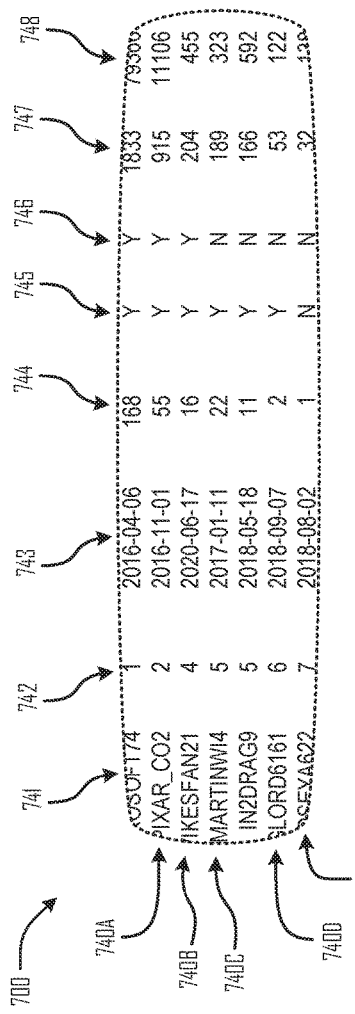
FIG. 7 depicts a media-resident record list in which one or more improved technologies may be incorporated.

FIG. 7 depicts a list 700 of records 740A-E each describing a (e.g. human) user or other content source 741 (e.g. a corporation or other entity 120). Each record 740 may include one or more instances of (privilege) tiers 741 (see FIG. 11); of dates 743 reflecting when that entity joined a cohort of users having privileges (e.g. according to the tiers 741) in some or all of network 620; of counts 744 (e.g. reflecting how many modules or versions have been uploaded by that entity); of (e.g. Boolean indications of) eligibility 745 for a lower privilege (e.g. posting a pictographic image or comment); of eligibility 746 for a higher privilege (e.g. posting a hyperlink or code component 630 so that it will be visible by other subscribers); of trustworthiness scores 747 (e.g. that increase over time at a variable rate absent suspicious behavior); of account balances 748 (e.g. of Dragon™ tokens or other utility tokens as described below); or of other tracked attributes (e.g. profile parameters) of an entity 120 having privileges on one or more servers 500A of network 620. In some variants such balances 748 may affect how fast a (positive scalar or other quantification of) trustworthiness of a content source 741 may increase, which may trigger (e.g. upon reaching a host-specified threshold as described herein) trigger a corresponding privilege (e.g. a power to upload content components 640).

Figure 8:
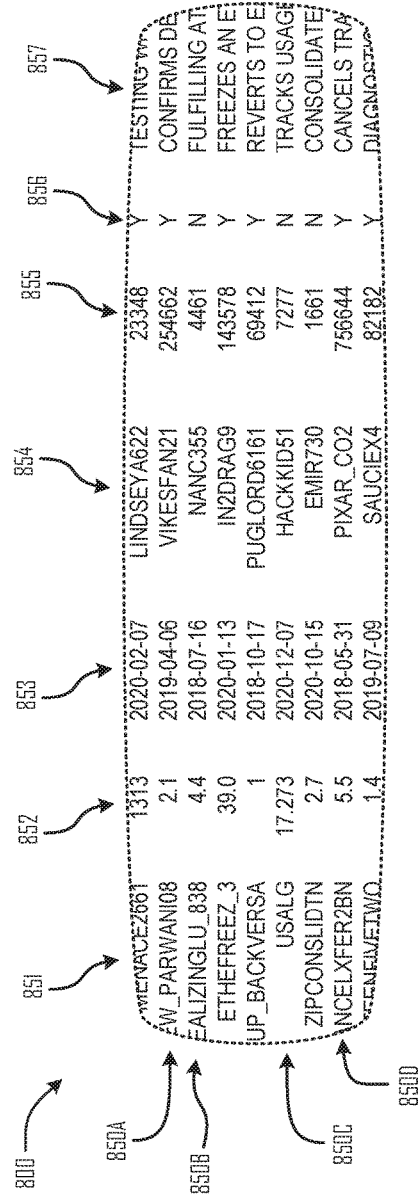
FIG. 8 depicts another media-resident record list in which one or more improved technologies may be incorporated.

FIG. 8 depicts a list 800 of records 850A-D each describing a smart contract or other device-executable code component 630 (e.g. in an inventory available to a particular user). Each record 850 may include one or more instances of alphanumeric or other module types 851; of alphanumeric or other version identifiers 852; of upload or release dates 853; of source identifiers 854 (e.g. corresponding to a content source 741 of list 700); of trustworthiness scores 855 (e.g. that increase over time at a variable rate absent suspicious behavior); of (Boolean indications of) suitability 856 for execution indicative of a high-enough trustworthiness (e.g. exceeding a threshold in effect for the particular user); of alphanumeric descriptors 857 describing each code component 630 (e.g. in a natural language) or version thereof; or of other tracked attributes (e.g. content components 640 in effect) of a code component 630 available for use on one or more servers 500A of network 620. In some variants such a current or recent balance 748 of a source 741 (e.g. with a source identifier 854 of "VIKESFAN21" in record 850A and record 740B) may affect how fast a (positive scalar or other quantification of) trustworthiness of a content component 640 is allowed to increase. This may trigger (e.g. upon reaching a host-specified threshold as described herein) a corresponding privilege (e.g. accessibility by or distribution to a larger cohort of users) for a given module or version 852.

Figure 9:
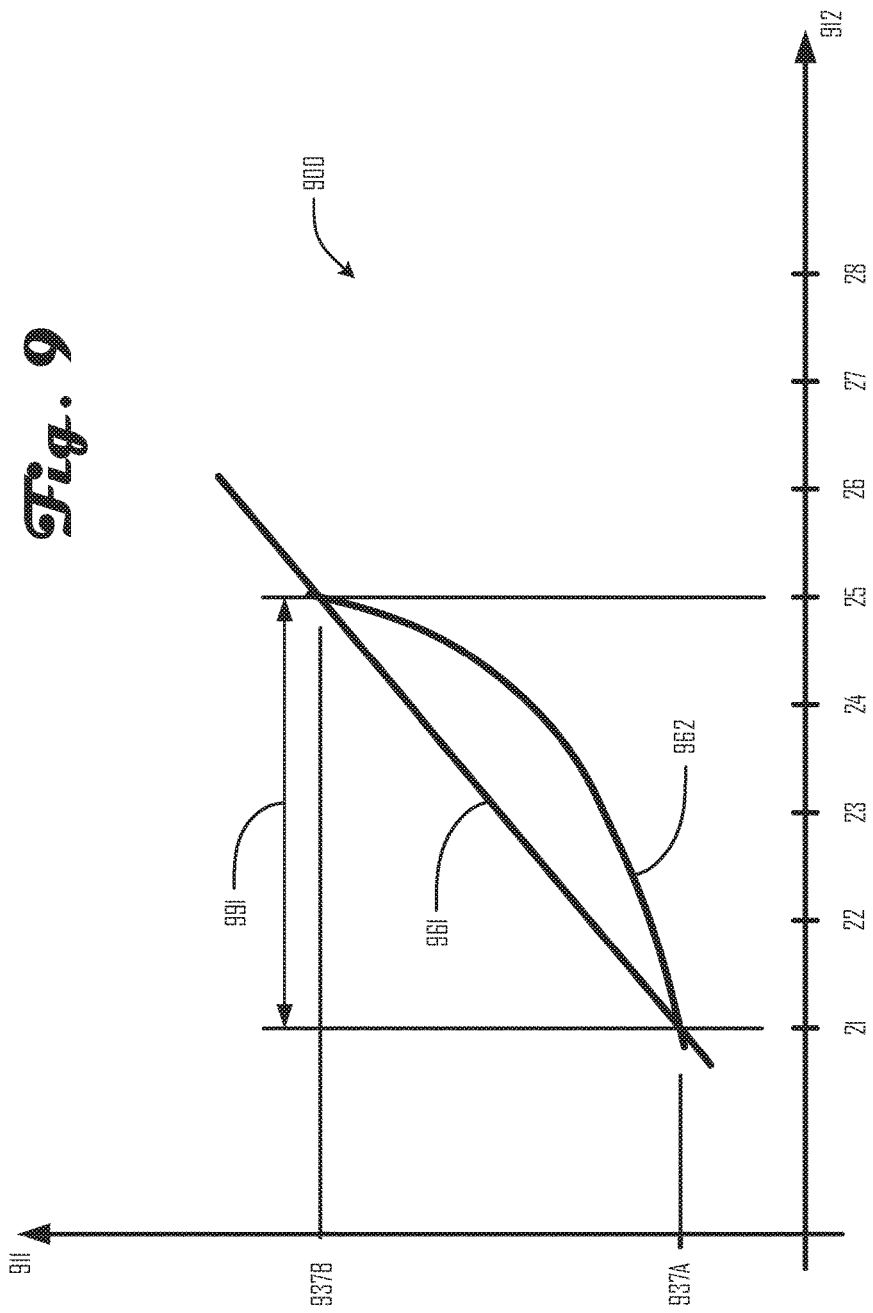
FIG. 9 is a plot showing how trustworthiness can increase over time in which one or more improved vetting technologies may be incorporated.

FIG. 9 exemplifies how (e.g. a scalar evaluation of) trustworthiness (e.g. of an entity or code component 630) can increase over time. A vertical axis 911 signifies a score 747, 855 (e.g. positively) indicative of trust plotted against a horizontal axis 912 signifying fixed units of time (e.g. days). A linear trajectory 961 shows trustworthiness increasing steadily from an initial value 937A to a threshold value 937B over a course of a few increments of time (e.g. from time 21 to time 25), wherein a privilege or other manifestation of status is bestowed (e.g. by one or more processors 502) upon reaching the threshold value 937B. In some variants an incremental increase or other manifestation of a slope of trajectory 961 may depend upon a current utility token balance 748 such that increasing the balance 748 incrementally decreases the interval 991 and decreasing the balance 748 incrementally increases the interval 991. In some variants an exponential, parabolic, hyperbolic, weighted polynomial, or other accelerating trajectory 962 may likewise quantify trustworthiness steadily increasing from initial value 937A to threshold value 937B over a course of the same interval 991. See FIGS. 11-12.

Figure 10:
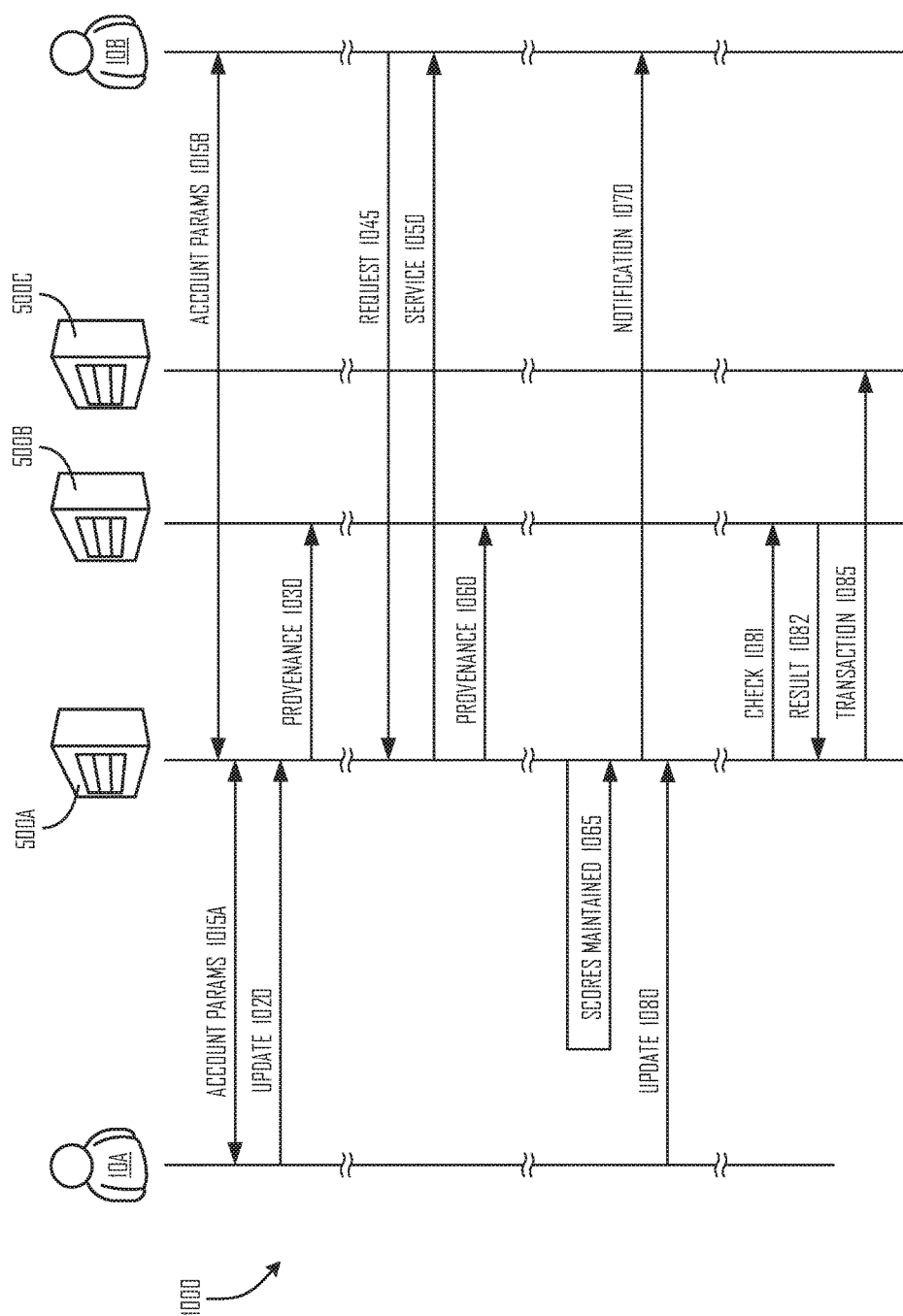
FIG. 10 depicts a particular scenario and progressive data flow in which client devices interact with one or more servers according to one or more improved technologies.

FIG. 10 depicts a particular scenario and progressive data flow 1000 in which client devices 300 (operated by users or other human entities 10A-B) interact with one or more servers 500A configured to control node 180, one or more servers 500B configured to facilitate access to node 170 (e.g. an Ethereum blockchain or other distributed ledger node featuring transaction-based state transitions and smart contract functionality), and one or more servers 500C configured to facilitate access to node 190 (e.g. a NEO blockchain or other distributed ledger node that supports code compiled into a secure executable environment). A coder or other human entity 10A configures a membership or similar account (e.g. on network 620) by establishing a profile and other account parameters 1015A. Likewise an execution requester or other human entity 10B configures a membership or similar account by establishing a profile and other account parameters 1015B as described herein.

Thereafter entity 10A uploads a smart contract update 1020 containing a smart contract or other device-executable code component 630 that becomes a definitive version 852 of that module type 851 upon recordation onto (a then-newest block 188A of) node 180. A corresponding code component update provenance 1030 (e.g. manifested as a hash function of block 188A or otherwise of content including code component 630) of that update 1020 is recorded onto a public node 170 (e.g. by one or more servers 500B thereof).

Some time later, a request 1045 for an execution of (whatever is the current version of) that module type 851 is sent from entity 10B (e.g. the "requester"). If status-related requirements (e.g. pertaining to privileges as described below) permit a grant of that request, an execution of the code component 630 commences (e.g. as service 1050) and a corresponding notification (of the grant) is sent. And a corresponding code component execution provenance 1060 (e.g. including one or more dispensations of any utility tokens 382 authorized by the requester and required for such execution) of that update 1020 is recorded onto a public node 170 (e.g. by one or more servers 500B thereof). In some variants, for example, such execution may include ongoing periodic or other multiple iterative component executions (e.g. every few hours or days) that effectively monitor one or more nodes 170 for the appearance of one or more defined phenomena of interest (e.g. transactions to or from a requester-specified digital wallet 366 that exceed a requester-specified event frequency).

Meanwhile scores 633, 747, 855 are updated or otherwise maintained 1065 (e.g. periodically in light of a current utility token balance 748). When such scores cross a threshold corresponding to an eligibility or other meaningful transition, a corresponding notification 1070 is sent to one or more entities 10B. When a smart contract update or other update 1080 occurs in relation to a code component 630 identified by an entity, in some variants that will trigger another such corresponding notification 1070.

If a smart contract service 1050 provides for iterative execution of a particular code component 630 that monitors one or more public nodes 170, a check 1081 of that node 170 (or a local instance 655 thereof) is initiated and a result 1082 is received (e.g. "Found" or "Not Found"). In some instances such results 1082 may be recorded to (e.g. a newest block of) or otherwise conditionally manifested as a transaction 1085 to another public blockchain (e.g. node 190). As used herein an "iterative" operation is one that occurs periodically (hourly or daily, e.g.) or otherwise repeatedly.

FIG. 11 depicts a semi-log plot 1100 with additional quantified examples of how trustworthiness (e.g. of an entity 10) can be deemed to increase over time. A vertical axis 1111 signifies (a logarithmic plot of) a score 747 indicative of trust plotted against a horizontal axis 1112 signifying fixed units of time (e.g. in years). As reflected in the tiers 742 pertaining to respective entities in FIG. 7, a tier 742 of "1" corresponds to range 1101 of scores 747 above 1600. Likewise a tier 742 of "2" corresponds to range 1102 of scores 747 above 800. Likewise a tier 742 of "3" corresponds to range 1103 of scores 747 above 400. Likewise a tier 742 of "4" corresponds to range 1104 of scores 747 above 200. Likewise a tier 742 of "5" corresponds to range 1105 of scores 747 above 100. Likewise a tier 742 of "6" corresponds to range 1106 of scores 747 above 50. Intermediate trajectory 1161 reflects how an entity identified as (a username of) "PIXAR_CO2" might have risen from an initial score 747 below 50 (in 2016) linearly to a most recent score 747 above 800 in 2022. A much faster trajectory 1162 indicates a traversal of range 1105 that would have taken much less than a year. However a transition 1167 marks decelerating transition (e.g. a divestiture of a substantial majority of utility tokens) experience by a user called "VIKESFAN" in late 2020, so that the traversal of range 1105 (across interval 1179) was actually much slower, taking more than a year to a most recent score of 204.

FIG. 12 like exemplifies how trustworthiness increases (e.g. from an initial value 1237A to a threshold value 1237B-C) can be made faster or slower, depicting a score 855 (e.g. of a smart contract or other code component 630) can be deemed to increase over time 1212 (e.g. in incremental units 41-49 of an hour or a day). In some variants a logarithmic, parabolic, hyperbolic, weighted polynomial, or other decelerating trajectory 1261 may likewise quantify trustworthiness steadily increasing from an initial value 1237A (e.g. signifying a transition 1267) to a threshold value 1237C over an intermediate interval 1291 of a few hours or days. On a slower trajectory 1262 (e.g. corresponding to a lower balance 748), a score 855 of the code component traverses the same increase in an interval 1292 that is more than 10% longer (slower) than the intermediate trajectory 1261. Likewise on a faster-than-intermediate trajectory 1263 (e.g. corresponding to a higher balance 748), a score 855 of the code component 630 traverses the same increase in an interval 1293 that is more than 10% shorter (faster) than the intermediate trajectory 1261. Moreover it can be seen from FIG. 9 that the same variations can be implemented for accelerating or linear trajectories 961-962 as well.

FIG. 13 depicts special-purpose transistor-based circuitry 1300—optionally implemented as an ASIC or in a UI governance server, for example—in which some or all of the functional modules described herein may be implemented. Transistor-based circuitry 1300 includes one or more instances of sequencing modules 1331, for example, each including an electrical node set 1341 upon which informational data is represented digitally as a corresponding voltage configuration 1351. Transistor-based circuitry 1300 likewise includes one or more instances of sequencing modules 1332 each including an electrical node set 1342 upon which informational data is represented digitally as a corresponding voltage configuration 1352. Transistor-based circuitry 1300 likewise includes one or more instances of responsive modules 1333 each including an electrical node set 1343 upon which informational data is represented digitally as a corresponding voltage configuration 1353. Transistor-based circuitry 1300 likewise includes one or more instances of responsive modules 1334 each including an electrical node set 1344 upon which informational data is represented digitally as a corresponding voltage configuration 1354. Transistor-based circuitry 1300 likewise includes one or more instances of responsive modules 1335 each including an electrical node set 1345 upon which informational data is represented digitally as a corresponding voltage configuration 1355. In some variants, as described below in the clauses and claims, such a module implements such functionality jointly (e.g. in conjunction with other modules or processors 302 described herein). Alternatively or additionally, in some variants such modules (or components thereof) may be distributed (e.g. so that some are implemented in special-purpose circuitry 522 of respective servers 500) as described above.

FIG. 1400 illustrates an operational flow 1400 suitable for use with at least one embodiment, such as may be performed (in some variants) on one or more servers 500 using special-purpose circuitry 522. As will be recognized by those having ordinary skill in the art, not all events of information management are illustrated in FIG. 14. Rather, for clarity, only those steps reasonably relevant to describing the distributed ledger interaction aspects of flow 1400 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 1410 describes recording one or more (device-executable code components 630, service version identifiers 641, terms version identifiers 642, or other) elements of a first version of a first smart contract privately on a first private blockchain (e.g. one or more sequencing modules 1331 in one or more servers 500A triggering a recordation of one or more elements 685B of a first version 631 of a first smart contract privately on node 180). This can occur, for example, in a context in which node 180 implements the first private blockchain, in which a timestamp of a block containing the entire first smart contract or a code component 630 thereof is manifested as a voltage configuration 1351 on node set 1341, in which version control of the first smart contract is maintained on the one or more servers 500A (e.g. on node 180); in which the one or more servers 500A are configured to disable and report on any actual or apparent instance of unauthorized activity discovered (e.g. by flagging the version and recording the discovery on node 180); in which the one or more servers 500A may suggest to a requesting entity 10B that an older version 852 of the same module type 851 may be used in response to data corruption or other indicia of defects resulting from an execution of one or more code components 630; in which insufficient termset-indicative or service-version-indicative metadata (or both) would otherwise be difficult to obtain in relation to a particular execution; in which a vulnerability in network 610 was first found by an enterprising discoverer (e.g. entity 10A); and in which the discoverer would otherwise be incentivized to exploit the vulnerability rather than report it.

Operation 1420 describes retrieving blockchain data in a first public blockchain by executing the first smart contract using one or more parameters that identify both the first public blockchain and the blockchain data to be retrieved (e.g. one or more sequencing modules 1332 of the one or more servers 500A initiating an execution of the first version 631 of the first smart contract and thereby retrieving the blockchain data using one or more parameters 634 that explicitly or otherwise identify both node 170 and the elements 685A to be retrieved from it). This can occur, for example, in a context in which node 170 implements the first public blockchain; in which the node data comprises one or more elements 685A of block 677A; in which an address of a local instance 655 of node 170 is manifested as a voltage configuration 1352 on node set 1342; in which the local instance 655 is kept current enough that the blockchain data is validly retrieved from the public node 170 (e.g. by updates of once or more per hour) even if the first smart contract really only ever reads from the local instance 655; and in which sequencing module 1332 invokes most or all of the responsive modules 1333-1335 described herein. This can occur, for example, in a context in which one or more responsive modules 1333 is configured to compute one or more scores 633, 747, 855 described above and to implement conditional privileges accordingly; in which resulting eligibilities 744-745 and suitabilities 856 (e.g. according to tiers 742 and threshold values 937, 1237 described herein) are thereby determined and manifested as a voltage configuration 1353 on node set 1343; and in which the special-purpose circuitry 1300 would not otherwise achieve a workable balance between expediting legitimate activity and disempowering mischief (e.g. trolling and other malicious activity).

Operation 1430 describes configuring a second smart contract to include a first transaction that is partly based on the blockchain data from the first public blockchain and partly based on a public ledger destination (e.g. one or more sequencing modules 1334 of the one or more servers 500A creating or adapting the second smart contract 625 to include one or more elements 685 in a transaction partly based on first public ledger node data from node 170 and partly based on an address of the public ledger destination). This can occur, for example, in a context in which the first public ledger node data includes one or more elements 685A of block 177A (as shown in FIG. 1); in which the public ledger destination comprises (a newest block 199 of) node 190; and in which the second smart contract 625 is assembled on one or more servers 500A of network 620.

Operation 1440 describes implementing the first transaction of the second smart contract partly based on the blockchain data from the first public blockchain and partly based on the public ledger destination (e.g. one or more sequencing modules 1335 of the one or more servers 500A implementing at least some of the second smart contract 625 include one or more elements 685C as the first transaction). This can occur, for example, in a context in which the public ledger destination includes node 170 (e.g. at block 177D); in which the first public ledger node data includes one or more elements 685A of block 177A (as shown in FIG. 1); and in which an inalterable version-controlled module type 851 (e.g. implementing the first smart contract or other built-in code component 630) could not otherwise be securely and selectively shared among users selectively (e.g. as a privilege described herein).

For example an instance of block 677E was recorded when a service version identifier 641 of a first smart contract was 1.5 and when a termset version identifier 642 of the first smart contract was 4.2 in a particular scenario relating to FIGS. 6 and 14. When block 677D was later recorded, a service version identifier 641 of the same smart contract became 1.6 (e.g. signifying a different version of the software implementing that smart contract). If an undesired and unforeseen problem is discovered by entity 10B in an output from the newer service version 1.6, an administrator of the one or more servers 500A may trigger a reversion to a prior service version state (e.g. version 1.5) or implement a new version 1.7 copied or adapted from earlier blocks (e.g. before block 677E) that is effectively the same as version 1.5 was. Likewise a termset version identifier 642 of the same smart contract became 4.3 upon block 677C being recorded. Such changes may signify a threshold 937, 1237 being adjusted, for example, or a utility token changing basis (e.g. from a unit of time to an instance of execution per token). If a complaint is received (e.g. reflecting an unexpected overcharge or misdirected token movement) in regard to terms or conditions of such service under version 4.3, an administrator of the one or more servers 500A may trigger a reversion to a prior termset version state (e.g. version 4.2) or implement a new version 4.45 copied or adapted from earlier blocks (e.g. before block 677E) that is effectively the same as version 4.2 was. Although the prior states of the service and termset versions are immutably recorded on node 180, they may remain private and readily available and, in some variants, may even be searchable within node 180.

FIG. 15 depicts event-sequencing logic 1500 that may be implemented or invoked (i.e. used for guiding a signal path or sequence of events) in one or more of the methods or systems 100, 200 described herein with regard to one or more individuals or other entities 1510. In some contexts, for example, a selected individual or other particular entity 1510A is designated to provide a security-related product or service (a validation or certification, e.g.) that another selected individual or other particular entity 1510B needs or has requested. One or more (instances of) decision protocols 1536 implement or monitor one or more outcomes 1545 each in the form of a record 1535 associating the entity/entities with each other or to a privilege (or both) as described below.

In a security-enhanced social media forum tailored for experienced users to share insights about Dragonchain platform tools or related aspects of blockchain, for example, a hierarchical privilege schema may be used in which only highly trusted entities 10, 210, 1510 are permitted to generate and own each original content thread 1530. This can occur, for example, in a context in which qualifying entities are automatically and conditionally determined using one or more highly selective original-content-thread-qualifying thresholds 1537A applied so that less-invested, less-committed forum participants cannot immediately serve this key function. One or more less-selective original-content-thread-qualifying thresholds 1537 may be imposed as a prerequisite for the unmoderated introduction of various types of replies 1532 in some variants. For example a privilege hierarchy may be imposed in which one or more graphic-image-qualifying thresholds 1537D may be imposed that are each less selective than a corresponding user-activatable-link-qualifying threshold 1537B or more selective than a corresponding thread-reply-qualifying threshold 1537C (or both).

Although many examples herein emphasize a correlation between privilege-related outcomes 1545 and (a tenure of) one or more inventories of cryptographic utility tokens (e.g. held for periods of weeks or months by many forum participants or other limited-access resource users), other determinants may also influence a trust-related score 633, 747, 855 of a candidate entity or option. For example such determinants may include a success ratio, a "like" count or similar metric of crowdsourced validation, an offered product or service price or required price threshold, or other such qualifying parameter. To accelerate an initial understanding such parameters may in some instances be simply treated as noise 1529. In instances where a signal-to-noise ratio is high enough—manifested as a large-enough correlation coefficient in plots like that of FIG. 17, for example—a family of trustworthiness indications suited to numerous applications is presented as a meaningful security advance in the fields of cryptographic utility tokens and distributed ledgers.

Outcomes 1545 of particular interest in examples described below include one or more instances of invitations 1541 (e.g. to participate in a beta test or similar group initiative), of selections 1542 (e.g. of an entity 1510A who will provide a security related product or service or of an entity 1510B who will receive the product or service), or of notifications 1543 or lists 1544. Such conditional notifications 1543 to an entity 10, 210, 1510 may concern projects or interactions not yet available to members of the entity's current tier 742 but within a prescribed range (e.g. of 1 or 2 tiers). Alternatively or additionally such outcomes 1545 may conditionally include identifications (in a list 1544) of other community members who are within such a prescribed range and who have expressed a willingness to be identified (for mentoring purposes, e.g.).

FIG. 16 depicts relative trustworthiness indications 1676 of several entities 10 varying across an interval 1688 of time 1605 (e.g. of several days or several months). A vertical axis signifies risk 1601 that is contraindicative of (putative) trustworthiness. A range of risk-indicative levels 1637A-G span a low trust level 1637A upward to one or more higher trust levels 1637F-G. Several entities 10 each have a respective initial trust level (i.e. roughly at a time 1681) and respective trajectory 1677. A gradual trajectory 1677A signifies a trustworthiness indication 1676 that does not change much over a prescribed interval. A steep trajectory 1677B signifies a trustworthiness indication 1676 that changes much more over a prescribed interval. After a transition interval 1688 as shown each of the entities 10 are shown as manifesting a respective trust level at a particular time 1682 and a respective trajectory 1677. In some contexts a trajectory 1677 may decrease in response to an inventory decrease or vice versa. Moreover in some variants as further described below, a progression of trust levels 1637A-G as shown may each implement a respective manifested-trust-indicative qualifying threshold value 937, 1237.

FIG. 17 depicts a transfer function 1700 generally indicating a positive correlation between a rate 1707 of respective trajectories 1677 and a respective inventory 1708 of cryptographic utility tokens 382. Such transfer functions may include one or more components 1555 based on one or more exponential functions 1551, logarithmic functions 1552, or polynomial functions 1553 of a corresponding inventory 1708. Alternatively or additionally, such transfer functions may reflect a cooldown function 1554 or other occurrence granting, modifying, or limiting an eligibility of an entity (in a normalized apportionment as described with reference to FIG. 23, e.g.). Such effects may be sudden or temporary (or both) in some implementations.

In some variants transfer function 1700 may effectively implement a staircase or other monotonic function 1755 that accounts for more than half of the data points 1786 (each representing a respective entity at a particular moment of time, e.g.) visible on a linear-scale scatter plot as shown. When such data points are sufficient in number (more than 12, e.g.) and not all aligned vertically or horizontally, they may define a useful "best fit" line or other "best fit" polynomial function that models the transfer function 1700 if a substantial correlation exists therebetween. As used herein, a rate 1707 and inventory 1708 are "substantially correlating" if any outlying data points 1786A are close and infrequent enough to a monotonic staircase function 1755 that the rate 1707 and inventory 1708 have a (Pearson product-moment) correlation coefficient with a magnitude greater than 0.6.

FIG. 18 depicts an apportionment 1801 to an initially trusted "first" entity 10 that increases in trust by daily increments through several weeks 31-37 to describe a context in which such growth is so slow that the "first" entity becomes untrusted in this period of time 1805. The (arbitrary raw) units of apportionment in this instance are shown to increase from below 1000 to above 1500 raw increments.

As used herein an apportionment is "fairly uniform" among a cohort of two or more entities if none of the entities is "trusted" or "untrusted." This can occur, for example, in a context in which an apportionment of each of the entities in the cohort differs from a median apportionment M of the cohort by less than 10%. Entities who have an apportionment within 10% of M are described herein as "intermediately trusted." If an intermediately trusted entity becomes less trusted (through partial divestiture or dilution, e.g.), that entity may become "untrusted." If an intermediately untrusted entity becomes more trusted (through heavy investment or other noteworthy participation, e.g.), that entity may become "trusted."

Jonathan

FIG. 19 depicts an apportionment 1802 to an initially untrusted "second" entity 10 that increases in trust by daily increments over a similar period (including a transitional interval 1988 and a suspiciously large growth 1989 signaling a possible attack, as further described below) to describe how such growth is so fast that the "second" entity becomes trusted in this period. The units of apportionment in this instance are shown to increase from below 500 to above 10000 raw increments.

FIG. 20 depicts an apportionment 1803 to a steady intermediate "third" entity 10 (neither trusted nor untrusted initially) that increases in trust by moderate daily increments to exemplify how such an entity can be neither trusted nor untrusted both before and after the transitional interval 1988.

FIG. 21 depicts a time-varying normalized apportionment 2181 comprises an instantaneous apportionment 2181A at the outset of week 31 that is proportional to the corresponding first-shown raw apportionment 1801 associated with the "first" entity. Likewise a time-varying normalized apportionment 2182 comprises an instantaneous apportionment 2182A at the outset of week 31 that is proportional to the corresponding first-shown raw apportionment 1802 associated with the "second" entity. Likewise a time-varying normalized apportionment 2183 comprises an instantaneous apportionment 2183A at the outset of week 31 that is proportional to the corresponding first-shown raw apportionment 1803 associated with the "third" entity. Just as apportionment 1803 is initially larger than apportionment 1802 and smaller than apportionment 1801 at the outset of week 31, so is instantaneous apportionment 2183A larger than apportionment instantaneous apportionment 2182A and smaller than apportionment instantaneous apportionment 2181A to which they correspond.

Likewise at the outset of week 33, the several normalized values 2181B, 2182B, 2183B respectively stand in proportion to their raw apportionment counterparts 1801-1803 at the outset of week 33. Likewise partway through week 36, the several normalized values 2181C, 2182C, 2183C respectively stand in proportion to their raw apportionment counterparts 1801-1803 at the same time partway through week 36. Likewise partway through week 37, the several normalized values 2181D, 2182D, 2183D respectively stand in proportion to their raw apportionment counterparts 1801-1803 at the same time partway through week 37. And just as the "second" entity's dramatic growth 1989 signals a significant shift in power (especially with trust lost by the first entity and gained by the second), a concern arises that such power concentrated in one entity may allow that entity to implement fraudulent transfers or validations if left unchecked. To guard against this possibility by keeping some power even within the control of an entity who has become untrusted, one or more attenuations are described below (with reference to FIGS. 24 and 26, e.g.). Such attenuations may, as described herein, maintain a balance between allowing cryptographic utility token inventories to serve their conventional functions and using inventory tenure to guard against nefarious software.

As used herein additional apportionments are "attenuated" if they signal diminishing returns for a later addition relative to that of an earlier addition (using a logarithmic or similar attenuation function, e.g.). See FIG. 24. As used herein a growth of a value is "large" if, during any one-week interval, the growth exceeds 100% (i.e. so that the value more than doubles). Likewise a growth is "very large" if, during a one-week interval, the growth exceeds 900% (i.e. so that the value increases by more than an order of magnitude). Likewise an apportionment dilution or other shrinkage of a value is "large" if, during a one-week interval, the shrinkage exceeds 50% (i.e. so that the value loses more than half its magnitude). As used herein a shrinkage of a value is "very large" if, during a one-week interval, the shrinkage exceeds 90%. As used herein an attenuation "prevents" an event if the event would have happened but-for the attenuation.

Figure 22:
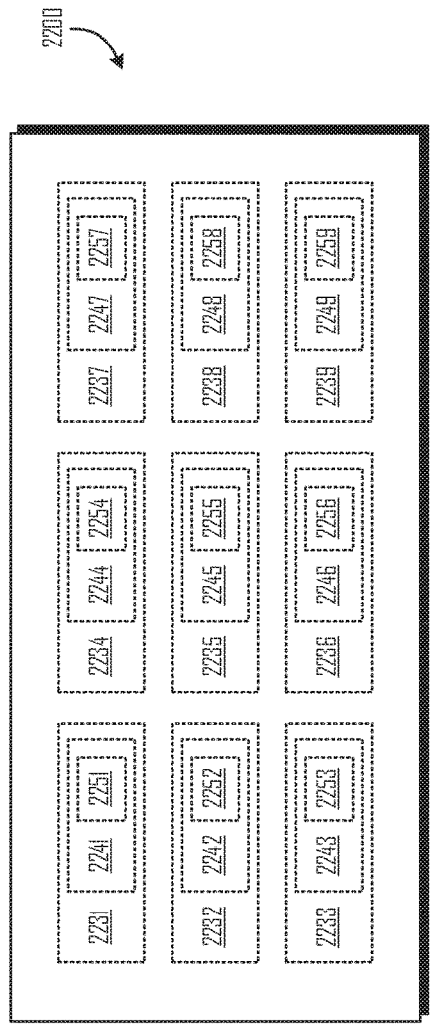
FIG. 22 depicts additional special-purpose transistor-based circuitry in which one or more improved technologies may be incorporated.

Referring now to FIG. 22, there is shown a special-purpose transistor-based circuitry 2200—optionally implemented as an ASIC or in a UI governance server, for example—in which some or all of the functional modules described herein may be implemented. Transistor-based circuitry 2200 includes one or more instances of association modules 2231, for example, each including an electrical node set 2241 upon which informational data is represented digitally as a corresponding voltage configuration 2251. Transistor-based circuitry 2200 likewise includes one or more instances of auditing modules 2232 each including an electrical node set 2242 upon which informational data is represented digitally as a corresponding voltage configuration 2252. Transistor-based circuitry 2200 likewise includes one or more instances of update modules 2233 each including an electrical node set 2243 upon which informational data is represented digitally as a corresponding voltage configuration 2253. Transistor-based circuitry 2200 likewise includes one or more instances of thread origination modules 2234 each including an electrical node set 2244 upon which informational data is represented digitally as a corresponding voltage configuration 2254. Transistor-based circuitry 2200 likewise includes one or more instances of sequencing modules 2235 each including an electrical node set 2245 upon which informational data is represented digitally as a corresponding voltage configuration 2255. Transistor-based circuitry 2200 likewise includes one or more instances of invocation modules 2236 each including an electrical node set 2246 upon which informational data is represented digitally as a corresponding voltage configuration 2256. Transistor-based circuitry 2200 likewise includes one or more instances of link posting modules 2237 each including an electrical node set 2247 upon which informational data is represented digitally as a corresponding voltage configuration 2257. Transistor-based circuitry 2200 likewise includes one or more instances of image posting modules 2238 each including an electrical node set 2248 upon which informational data is represented digitally as a corresponding voltage configuration 2258. Transistor-based circuitry 2200 likewise includes one or more instances of thread reply modules 2239 each including an electrical node set 2249 upon which informational data is represented digitally as a corresponding voltage configuration 2259. In some variants, as described below in the clauses and claims, such a module implements such functionality jointly (e.g. in conjunction with one or more invocation modules 2236 or processors 302 described herein). Alternatively or additionally, in some variants such modules (or components thereof) may be distributed (e.g. so that some are implemented in special-purpose circuitry 522 of respective servers 500) as described above.

Figure 23:
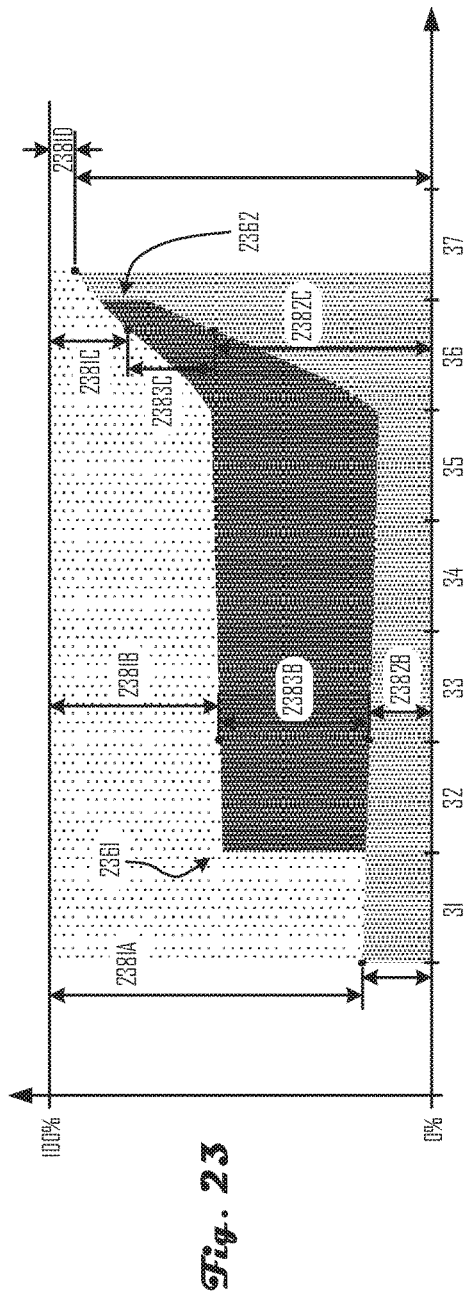
FIG. 23 depicts time-varying normalized apportionments like those of FIG. 21 but reflecting dedications of apportionments transferred among the eligible entities.

FIG. 23 depicts time-varying normalized apportionments like those of FIG. 21 but reflecting dedications 2361, 2362 of apportionments transferred among entities who are eligible at least before or after such dedications. A time-varying normalized apportionment 2381 comprises an instantaneous apportionment 2381A at the outset of week 31 that is proportional to a sum of the corresponding first-shown raw apportionment 1801, 1802 associated with the "first" and "third" entities, signifying an alternative event sequence in which the "third" entity 10 does not become eligible until the end of week 31. At that point a partial dedication 2361 authorized by the "first" entity allows a large minority of the "first" entity's apportionment 2381 to be dedicated to the "third" entity and thereby allows the "third" apportionment 2383 to come into being.

At the outset of week 33 in this alternative event sequence, the several normalized values 2381B, 2382B, 2383B respectively stand in proportion to their raw apportionment counterparts 1801-1803 at the outset of week 33 as shown in FIGS. 18-21. Likewise partway through week 36, the several normalized values 2381C, 2382C, 2383C respectively stand in proportion to their raw apportionment counterparts 1801-1803 at the same time partway through week 36 just as shown in FIGS. 18-21. In the alternative event sequence of FIG. 23, however, a complete dedication 2362 allows an entirety of the "third" entity's apportionment 2383 to be dedicated to the "second" entity, rendering the "third" entity again ineligible. This dedication 2362 will create a higher likelihood that the "second" entity would prevail in a probabilistic selection 1542 that occurs thereafter, but systemic integrity is nonetheless maintained by virtue of the attenuation described below, insofar that a significant apportionment 2381D will remain with the now-untrusted "first" entity (equal to apportionment 2181D) during any such selection. Moreover it is hoped that a risk of a probabilistic selection 1542 in favor of the now-untrusted "first" entity, even if diminished to one part-per-million or lower, would effectively deter even an affluent and nefarious artificial intelligence coordinating the activities of the "second" entity.

As used herein a "probabilistic selection" is an unforeseeable (i.e. random or pseudorandom) selection in which a likelihood of each eligible entity Ei being selected/matched depends upon a size of a corresponding one of the apportionments A1-N in relation to one or more other entities Ej who are also eligible and a size of one or more apportionments A1-N to which they each correspond, wherein N>1.

Figure 24:
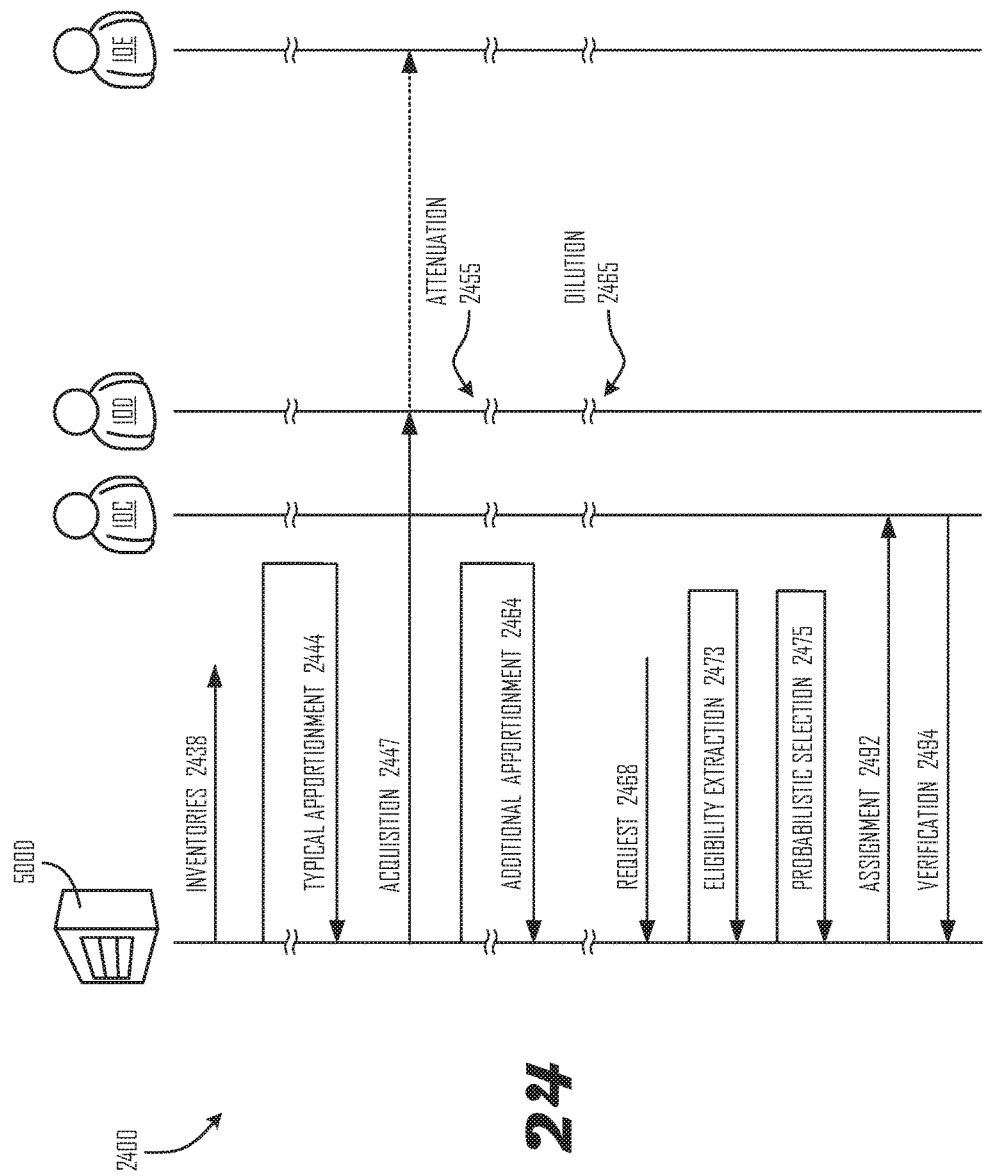
FIG. 24 depicts a particular scenario and progressive data flow in which client devices may each interact with one or more servers generally as described above with reference to FIG. 10.

FIG. 24 depicts a particular scenario and progressive data flow 2400 in which client devices 300 may interact with one or more servers 500D generally as described above with reference to FIG. 10. Various human entities 10 A-E each establish a membership or similar account (e.g. on network 620) by creating a profile and providing various account parameters 1015. Thereafter they acquire respective inventories 2438 of cryptographic utility tokens and receive a typical apportionment 2444 (across a transition interval 1588, 1988 as described above, for example). Thereafter they may initiate one or more acquisitions 2447 of additional inventories of cryptographic utility tokens and accordingly receive additional apportionments 2464 (across a transition interval 1588, 1988 as described above, for example). As used herein an apportionment is "additional" if it signals an increase in trust, whether or not a negative or other inverse trust index (quantifying risk 1601, e.g.) is used. To the extent that such additional inventories seem to signal an attack, however, an attenuation 2455 mitigates such additional apportionments 2464 as a deceleration (observable as a shrinkage in the upward trend at higher inventories as shown in FIG. 17) and a somewhat smaller dilution 2465 affecting one or more entities 10C who did not participate in such acquisition than would have occurred without the attenuation 2465. Even if the additional apportionment 2464 causes an enormous aggregation of most or all of the available cryptographic utility token supply, a possibility thus remains that a marginalized entity 10C may be selected to provide a verification, the risk of which may effectively deter attacks upon networks 620 in which the safeguards described herein are in effect.

Figure 25:
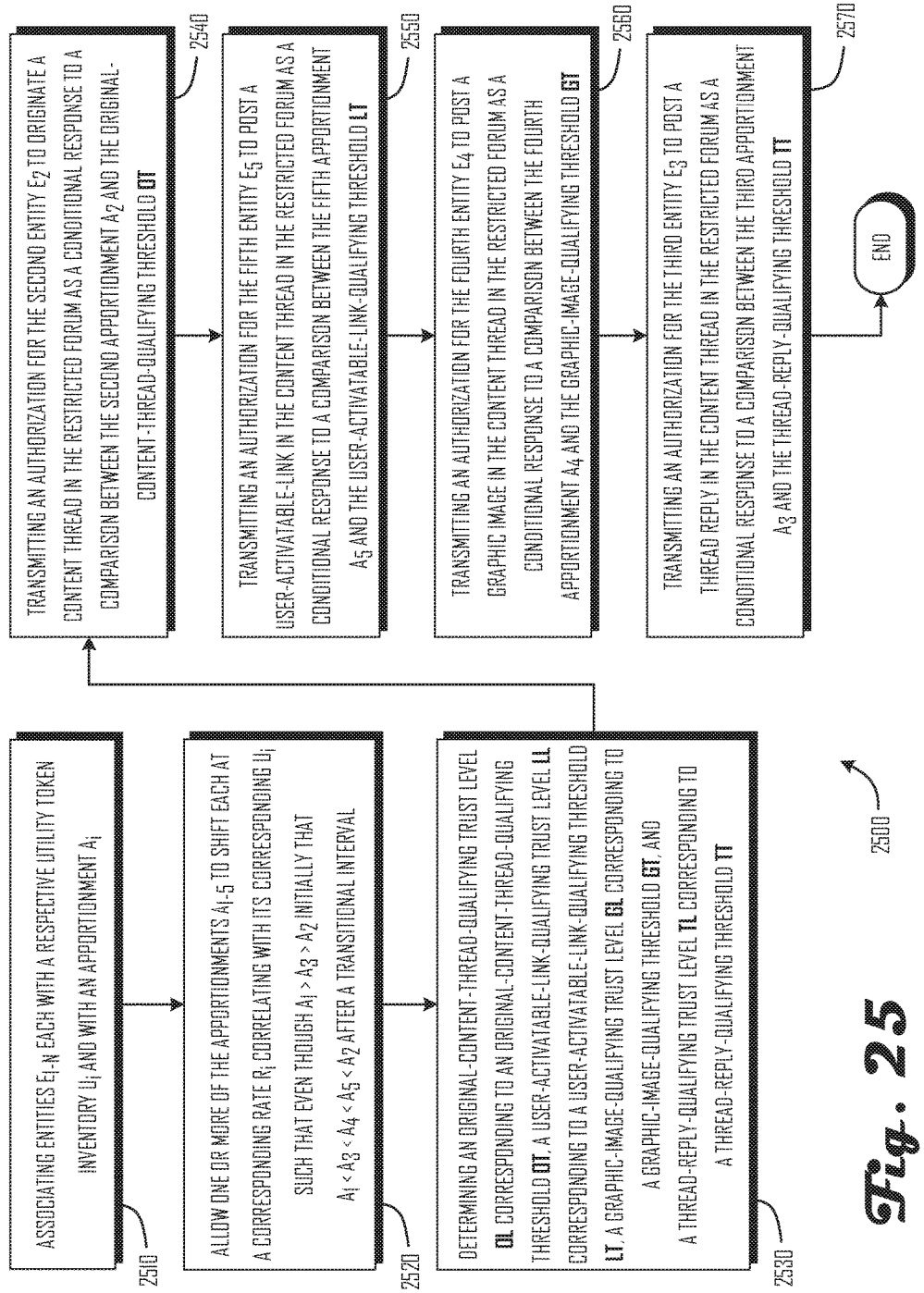
FIG. 25 depicts an operational flow in which one or more improved technologies may be incorporated for data filtering configured to protect a restricted forum or its participants from malicious uploads or participants (or both).

FIG. 25 depicts a security implementation flow 2500 in which one or more improved technologies may be incorporated. As shown operation 2510 may be performed by one or more instances of association modules 2231 within which one or more corresponding voltage configurations 2251 manifest one or more records 1535 that each associate an entity identifier with an inventory 1708 or a history thereof. As shown operation 2520 may be performed by one or more instances of auditing modules 2232 within which one or more corresponding voltage configurations 2252 manifest one or more fractional probability/likelihood expression such as a normalized apportionment 2181-2183. As shown operation 2530 may be performed by one or more instances of sequencing modules 2235 within which one or more corresponding voltage configurations 2255 manifest one or more thresholds 1537 operably coupled to a comparator, optionally implemented so that OL>LL>GL>TL. As shown operation 2540 may be performed by one or more instances of thread origination modules 2234 within which one or more corresponding voltage configurations 2254 manifest one or more headers 1531 of an original thread 1530. As shown operation 2550 may be performed by one or more instances of link posting modules 2237 within which one or more corresponding voltage configurations 2257 manifest one or more appropriately authorized hyperlinks 1534. As shown operation 2560 may be performed by one or more instances of image posting modules 2238 within which one or more corresponding voltage configurations 2258 manifest one or more appropriately authorized images 1533. As shown operation 2570 may be performed by one or more instances of thread reply modules 2239 within which one or more corresponding voltage configurations 2259 manifest one or more appropriately authorized text-only replies 1532.

This can occur, for example, in a context in which an administrator of a security-enhanced social media forum could not otherwise recognize differentiating categories of potential harm as respective opportunities to balance the need for fluid and inclusive user group discussion with avoiding serious harm to the forum or its members. Members with serious cryptographic security token inventories can be relied upon, to the extent that such inventories are held for long periods, to have the inclination and perhaps even the ability to avoid introducing harmful content and to promote worthy content. Entities who merely own a large volume of utility tokens are less trustworthy even to refrain from harassment or posting illegal pornography for mischief or vengeance. By using the specific determinants described herein combining social media content type with cryptographic utility token inventory size and duration, a near real-time automated content curation (i.e. within one minute of upload) is feasible, allowing for the possibility of nearly continuous forum access for almost any user with expertise in using the cryptographic utility tokens 382.

FIG. 26 depicts another security implementation flow in which one or more improved technologies may be incorporated. As shown operation 2610 may be performed by one or more instances of association modules 2231 within which one or more corresponding voltage configurations 2251 manifest one or more records 1535 that each associate an entity identifier with an inventory 1708 or a history thereof. As shown operation 2620 may be performed by one or more instances of auditing modules 2232 within which one or more corresponding voltage configurations 2252 manifest one or more fractional probability/likelihood expression such as a normalized apportionment 2181-2183. As shown operation 2630 may be performed by one or more other instances of auditing modules 2232 within which one or more corresponding voltage configurations 2252 manifest one or more appropriately authorized text-only replies 1532. As shown operation 2640 may be performed by one or more instances of update modules 2233 within which one or more corresponding voltage configurations 2253 manifest a scalar quantification of a current inventory 1708. As shown operation 2650 may be performed by one or more instances of sequencing modules 2235 within which one or more corresponding voltage configurations 2255 manifest one or more random or pseudorandom selections 1542 (in a record 1535, e.g.).

In light of teachings herein, numerous existing techniques may be applied for configuring special-purpose circuitry or other structures effective for configuring and otherwise managing transactions and other operations as described herein without undue experimentation. See, e.g., U.S. Pat. No. 9,747,586 ("System and method for issuance of electronic currency substantiated by a reserve of assets"); U.S. Pat. No. 9,672,499 ("Data analytic and security mechanism for implementing a hot wallet service"); U.S. Pat. No. 9,646,029 ("Methods and apparatus for a distributed database within a network"); U.S. Pat. No. 9,569,771 ("Method and system for storage and retrieval of blockchain blocks using Galois fields"); U.S. Pat. No. 9,569,439 ("Context-sensitive query enrichment"); U.S. Pub. No. 20180183687 ("System and Method for Managing Services and Licenses Using a Blockchain Network; U.S. Pub. No. 20180183606 ("Verifying Authenticity of Computer Readable Information Using the Blockchain; U.S. Pub. No. 20180129955 ("Hybrid Blockchain Data Architecture for use Within a Cognitive Environment; U.S. Pub. No. 20170364698 ("Fragmenting data for the purposes of persistent storage across multiple immutable data structures; U.S. Pub. No. 20170287090 ("System and method for creating and executing data-driven legal contracts; U.S. Pub. No. 20170116693 ("Systems and Methods for Decentralizing Commerce and Rights Management for Digital Assets Using a Blockchain Rights Ledger; U.S. Pub. No. 20170109668 ("Model for Linking Between Nonconsecutively Performed Steps in a Business Process; U.S. Pub. No. 20170109639 ("General Model for Linking Between Nonconsecutively Performed Steps in Business Processes; U.S. Pub. No. 20170109638 ("Ensemble-Based Identification of Executions of a Business Process"); U.S. Pub. No. 20160260095 ("Containerized Computational Task Execution Management Using a Secure Distributed Transaction Ledger"); U.S. Pub. No. 20120095908 ("Distributed Computing for Engaging Software Services"); U.S. Pub. No. 20120020476 ("Method for Performing a Cryptographic Task in an Electronic Hardware Component"); and U.S. Pub. No. 20100332336 ("System and method for electronic wallet conversion").

In particular, numerous existing techniques may be applied for configuring special-purpose circuitry or other structures effective for determining correlations, updating trust-related indicia, allocating tasks, or other security functions as described herein without undue experimentation. See, e.g., U.S. patent Ser. No. 10/121,025 ("Content validation using blockchain"); U.S. patent Ser. No. 10/068,397 ("System and method for access control using context-based proof"); U.S. patent Ser. No. 10/063,568 ("User behavior profile in a blockchain"); U.S. patent Ser. No. 10/050,959 ("Synthetic genomic variant-based secure transaction devices, systems and methods"); U.S. Pub. No. 20180332070 ("User Behavior Profile Environment"); U.S. Pub. No. 20180300476 ("Dynamic episodic networks"); U.S. Pub. No. 20180332072 ("User Behavior Profile Including Temporal Detail Corresponding to User Interaction"); U.S. Pub. No. 20180167198 ("Trust Enabled Decentralized Asset Tracking for Supply Chain and Automated Inventory Management"); U.S. Pub. No. 20180157825 ("Systems and Methods for Determining Trust Levels for Computing Components Using Blockchain"); U.S. Pub. No. 20180097841 ("System and method for omnichannel social engineering attack avoidance"); and U.S. Pub. No. 20130061288 ("Method for controlling trust and confidentiality in daily transactions of the digital environment").

Although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, specific combinations of aspects and embodiments are articulated in a shorthand form such that (1) according to respective embodiments, for each instance in which a "component" or other such identifiers appear to be introduced (e.g. with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Clauses

1. A security method at least party based on a utility token inventory tenure, the security method comprising:

invoking transistor-based circuitry (e.g. one or more association modules 2231 of transistor-based circuitry 2200) configured to associate a first entity 10 with a first utility token inventory 1708 and a first trustworthiness indication 1676, wherein the first trustworthiness indication is a first apportionment A1 (e.g. see "first" apportionments depicted with reference to FIG. 16, 18, or 21-26);

invoking transistor-based circuitry (e.g. one or more other association modules 2231 of transistor-based circuitry 2200) configured to associate a second entity 10 with a second utility token inventory 1708 and a second trustworthiness indication 1676, wherein the second trustworthiness indication is a second apportionment A2 (e.g. see "second" apportionments depicted with reference to FIG. 16, 19, or 21-26);

invoking transistor-based circuitry (e.g. one or more other association modules 2231 of transistor-based circuitry 2200) configured to associate a third entity 10 with a third utility token inventory 1708 and a third trustworthiness indication 1676, wherein the third trustworthiness indication is a third apportionment A3 (e.g. see "third" apportionments depicted with reference to FIG. 16 or 20-26);

invoking transistor-based circuitry (e.g. one or more auditing modules 2232 or update modules of transistor-based circuitry 2200) configured to observe one or more of the first, second, or third apportionments shifting across a transitional interval 1588, 1988 each at a corresponding rate 1707 (e.g. at a steep trajectory 1677A or a gradual trajectory 1677B, e.g.) correlating with its corresponding utility token inventory 1708 such that even though A1>A3>A2 initially that A1<A3<A2 after the transitional interval 1688, 1988 (e.g. as depicted in FIG. 16 or 19);

invoking transistor-based circuitry (e.g. one or more comparison modules 2233 of transistor-based circuitry 2200) configured to apply one or more trust-indicative qualifying threshold values 937, 1237 (e.g. as depicted in FIG. 9 or 12) each manifesting a corresponding trust level 1637; and invoking transistor-based circuitry (e.g. one or more sequencing modules 2235 of transistor-based circuitry 2200) configured to transmit (an invitation, authorization, disabled control, or other visible expression/humanly observable presentation of) a selectively inclusive outcome 1545 of a decision protocol 1536 conditionally, as an automatic response (at least partly) based on the transitional interval 1588, 1988 being long enough.

2. The method of ANY one of the above method clauses, comprising:

transmitting an invitation 1541 for the second entity 10 to participate in a beta software release as an automatic and conditional response to a determination that the second apportionment A2 has reached or exceeded a beta software release participation threshold; and transmitting software access authorization data (comprising a hyperlink or access key, e.g.) as a conditional response to a reply 1532 indicating the second entity 10 has accepted the invitation 1541.

4. The method of ANY one of the above method clauses, comprising:

determining one or more changes that occurred during the transitional interval 1588, 1988 in the first, second, and third apportionments each according to a respective trajectory 1677 corresponding with a rate 1707 at least partly based on and having a substantial correlation with a respective one of the first, second, or third utility token inventories 1708, wherein the "substantial" correlation signifies that the (effective) rates 1707 and token inventories 1708 exhibit a (Pearson product-moment) correlation coefficient R with a magnitude greater than 0.6.

3. The method of ANY one of the above method clauses, comprising:

implementing a staircase-type transfer function 1755 that exhibits a substantial correlation between numerous rates 1707 and a corresponding one of numerous utility token inventories 1708 wherein the rates 1707 each affect a corresponding one of numerous apportionments 1801-1803 that include the first, second, and third apportionments and wherein the numerous utility token inventories 1708 include the first, second, and third utility token inventories.

4. The method of ANY one of the above method clauses, comprising:

implementing a staircase-type transfer function 1755 that exhibits a substantial correlation between numerous rates 1707 and a corresponding one of numerous utility token inventories 1708 wherein the rates 1707 each affect a corresponding one of numerous apportionments 1801-1803 that include the first, second, and third apportionments, wherein the numerous utility token inventories 1708 include the first, second, and third utility token inventories, and wherein the rates 1707 and the inventories 1708 collectively have a Pearson product-moment correlation coefficient with a magnitude greater than 0.75.

5. The method of ANY one of the above method clauses, comprising:

implementing a staircase-type transfer function 1755 that exhibits a substantial correlation between numerous rates 1707 and a corresponding one of numerous utility token inventories 1708 wherein the rates 1707 each affect a corresponding one of numerous apportionments 1801-1803 that include the first, second, and third apportionments, wherein the numerous utility token inventories 1708 include the first, second, and third utility token inventories, and wherein the rates 1707 and the inventories 1708 collectively have a Pearson product-moment correlation coefficient with a magnitude greater than 0.95.

6. The method of ANY one of the above method clauses, comprising:

implementing a staircase-type transfer function 1755 that exhibits a substantial correlation between numerous rates 1707 and a corresponding one of numerous utility token inventories 1708 wherein the rates 1707 each affect a corresponding one of numerous apportionments 1801-1803 that include the first, second, and third apportionments, wherein the numerous utility token inventories 1708 include the first, second, and third utility token inventories, and wherein the rates 1707 and the inventories 1708 collectively have a Pearson product-moment correlation coefficient with a magnitude greater than 0.99.

7. The method of ANY one of the above method clauses, wherein an expenditure of at least a fraction of a cryptographic utility token by a sixth entity 10 who thereby requests a service that includes executing the first smart contract increases a time interval 1988 until the sixth entity obtains an eligibility (e.g. by reducing a rate 1707 of apportionment increase and thereby delaying a crossing of a threshold 1537 associated with the eligibility).

8. The method of ANY one of the above method clauses, comprising:

determining one or more changes that occurred during the transitional interval 1588, 1988 in the first, second, and third apportionments each according to a rate 1707 (e.g. corresponding to a relatively gradual trajectory 1677A, a steeper trajectory 1677B, or other values therebetween generally as depicted in FIGS. 16-17) at least partly based on a respective one of the first, second, or third utility token inventories 1708.

9. The method of ANY one of the above method clauses, comprising:

iteratively determining one or more changes that occurred during the transitional interval 1588, 1988 in the first, second, and third apportionments each according to a time-varying respective trajectory 1677 corresponding with a rate 1707 at least partly based on and correlating with a respective one of the first, second, or third utility token inventories 1708 among a cohort of numerous utility token inventories 1708.

10. The method of ANY one of the above method clauses, comprising:

expressing the apportionments 2181-2183 as percentages each as a (percentage or other) fractional value greater than zero and less than one (as shown in FIGS. 21 & 23).

11. The method of ANY one of the above method clauses, comprising:

determining one or more changes that occurred during the transitional interval 1588, 1988 in the first, second, and third apportionments 2181-2183 each according to a respective trajectory 1677 corresponding with a rate 1707 at least partly based on and having a substantial correlation with a respective one of the first, second, or third utility token inventories 1708, wherein the correlation signifies that the rates 1707 and token inventories 1708 exhibit a (Pearson product-moment) correlation coefficient R with a magnitude greater than 0.75 among a cohort of numerous utility token inventories 1708.

12. The method of ANY one of the above method clauses, comprising:

determining one or more changes that occurred during the transitional interval 1588, 1988 in the first, second, and third apportionments 2181-2183 each according to a respective trajectory 1677 corresponding with a rate 1707 at least partly based on and having a substantial correlation with a respective one of the first, second, or third utility token inventories 1708, wherein the correlation signifies that the rates 1707 and token inventories 1708 exhibit a (Pearson product-moment) correlation coefficient R with a magnitude greater than 0.95 among a cohort of numerous utility token inventories 1708.

13. The method of ANY one of the above method clauses, comprising:

determining one or more changes that occurred during the transitional interval 1588, 1988 in the first, second, and third apportionments 2181-2183 each according to a respective trajectory 1677 corresponding with a rate 1707 at least partly based on and having a substantial correlation with a respective one of the first, second, or third utility token inventories 1708, wherein the correlation signifies that the rates 1707 and token inventories 1708 exhibit a (Pearson product-moment) correlation coefficient R with a magnitude greater than 0.99 among a cohort of numerous utility token inventories 1708.

14. The method of ANY one of the above method clauses, comprising:

recording one or more elements of a first version of a first smart contract privately on a first cryptographically authenticatable node in response to the first entity 10 transmitting a request for an execution of a first smart contract, the request including an expenditure of a number of special-purpose cryptographic utility tokens 382 from the first utility token inventory 1708, wherein the number is greater than zero.

15. The method of ANY one of the above method clauses, comprising:

recording one or more elements of a first version of a first smart contract privately on a first cryptographically authenticatable node in response to the first entity 10 transmitting a request for an execution of a first smart contract, the request including an expenditure of a number of special-purpose cryptographic utility tokens 382 from the first utility token inventory 1708, wherein the number is greater than zero and less than one.

16. The method of ANY one of the above method clauses, comprising:

recording one or more elements of a first version of a first smart contract privately on a first cryptographically authenticatable node in response to the first entity 10 transmitting a request for an execution of a first smart contract, the request including an expenditure of a number of special-purpose cryptographic utility tokens 382 from the first utility token inventory 1708; and executing the first version of the first smart contract so as to retrieve first cryptographically authenticatable node data in a first cryptographically authenticatable node by executing the first version of the first smart contract using one or more parameters that identify both the first cryptographically authenticatable node and the first cryptographically authenticatable node data to be retrieved and so as to configure a second smart contract to include a first transaction that is partly based on the first cryptographically authenticatable node data from the first cryptographically authenticatable node and partly based on a first attribute of a distributed ledger destination and so as to implement the first transaction of the second smart contract partly based on the first cryptographically authenticatable node data from the first cryptographically authenticatable node and partly based on the distributed ledger destination identifying the first cryptographically authenticatable node or one or more other cryptographically authenticatable nodes (or both).

17. The method of ANY one of the above method clauses, wherein a stateless smart contract initiation protocol is used in accepting an expenditure of a number of special-purpose cryptographic utility tokens 382 from the first utility token inventory 1708 in response to the first entity 10 transmitting a request for an execution of a smart contract.

18. The method of ANY one of the above method clauses, wherein a Representation State Transfer protocol is used as a stateless smart contract initiation protocol in accepting an expenditure of a special-purpose cryptographic utility token 382 from the first utility token inventory 1708 in response to the first entity 10 transmitting a request for an execution of a smart contract.

19. The method of ANY one of the above method clauses, comprising:
  iteratively monitoring one or more public nodes for one or more requester-specified phenomena of interest by another entity 10, wherein the one or more requester-specified phenomena of interest include first and second asset transfers from a requester-specified digital wallet; and
  transmitting to one or more mining rig nodes a result of the first transaction of the second smart contract partly based on the first cryptographically authenticatable node data from the first cryptographically authenticatable node and partly based on the distributed ledger destination being implemented.

20. The method of ANY one of the above method clauses, wherein the invoking the transistor-based circuitry configured to allow the one or more of the first, second, or third apportionments to shift across the transitional interval 1588, 1988 each at the corresponding rate 1707 correlating with its corresponding utility token inventory 1708 comprises:
  monitoring as the first entity 10 becomes untrusted and the second entity 10 becomes trusted during the transitional interval 1688, 1988;
  thereafter monitoring a large growth (i.e. more than doubling) of the second utility token inventory 1708 (e.g. as described with reference to FIG. 26 at operation 2630);
  providing an additional apportionment (e.g. reflected in growth 1989) to the trusted second entity resulting from the large growth with a cumulative incremental attenuation 2455 upon the additional apportionment; and
  thereafter using one or more of the apportionments 2181-2183 in a probabilistic selection 1542 of a single one the entities 10 in creating an integrity verification task assignment 2492.

21. The method of ANY one of the above method clauses, wherein an attenuation as described herein is performed (by a module of special-purpose circuitry, e.g.) in response to an attack in which an entity 10 has an apportionment 1802 that grows more than 100% within one week 36.

22. The method of ANY one of the above method clauses, wherein the invoking the transistor-based circuitry configured to allow the one or more of the first, second, or third apportionments 2181-2183 to shift across the transitional interval 1588, 1988 each at the corresponding rate 1707 correlating with its corresponding utility token inventory 1708 comprises:
  allowing the first entity 10 to become untrusted and the second entity 10 to become trusted during the transitional interval 1688, 1988;
  thereafter allowing a large growth (i.e. more than doubling) of the second utility token inventory 1708 (e.g. as described with reference to FIG. 26 at operation 2630);
  iteratively providing an additional apportionment (e.g. reflected in growth 1989) to the trusted second entity resulting from the large growth with a cumulative incremental attenuation 2455 upon the additional apportionment, wherein the cumulative incremental attenuation 2455 is large enough to protect a net apportionment 2181 of the untrusted first entity from suffering a very large dilution 2465 notwithstanding the large growth of the second utility token inventory 1708; and
  thereafter using one or more of the apportionments 2181-2183 in a probabilistic selection 1542 of a single one the entities 10 in creating an integrity verification task assignment 2492.

23. The method of ANY one of the above method clauses, wherein the invoking the transistor-based circuitry configured to allow the one or more of the first, second, or third apportionments 2181-2183 to shift across the transitional interval 1588, 1988 each at the corresponding (nominally steady or other) rate 1707 correlating with its corresponding (constant or other) utility token inventory 1708 comprises:
  allowing the first entity 10 to become untrusted and the second entity 10 to become trusted during the transitional interval 1688, 1988;
  thereafter allowing a large growth (i.e. more than doubling) of the second utility token inventory 1708 (e.g. as described with reference to FIG. 26 at operation 2630);
  iteratively providing an additional apportionment (e.g. reflected in growth 1989) to the trusted second entity resulting from the large growth with a cumulative incremental attenuation 2455 upon the additional apportionment, wherein the cumulative incremental attenuation 2455 is large enough to protect a net apportionment 2181 of the untrusted first entity from suffering a very large dilution 2465 notwithstanding the large growth of the second utility token inventory 1708; and
  thereafter using one or more of the apportionments in a probabilistic selection 1542 of a single one the entities 10 in creating a task assignment 2492 that allows the single one of the entities to perform an integrity verification 2494.

24. The method of ANY one of the above method clauses, wherein the invoking the transistor-based circuitry configured to allow the one or more of the first, second, or third apportionments 2181-2183 to shift across the transitional interval 1588, 1988 each at the corresponding (nominally steady or other) rate 1707 correlating with its corresponding (constant or other) utility token inventory 1708 comprises:
  allowing the first entity 10 to become untrusted and the second entity 10 to become trusted during the transitional interval 1688, 1988;
  thereafter allowing a large growth (i.e. more than doubling) of the second utility token inventory 1708 (e.g. as described with reference to FIG. 26 at operation 2630);
  iteratively providing an additional apportionment (e.g. reflected in growth 1989) to the trusted second entity resulting from the large growth with a cumulative incremental attenuation 2455 upon the additional apportionment, wherein the cumulative incremental attenuation 2455 is large enough to protect a net apportionment 2181 of the untrusted first entity from suffering a very large dilution 2465 notwithstanding the large growth of the second utility token inventory 1708; and
  thereafter using one or more of the apportionments in a probabilistic selection 1542 of a single one the entities 10 in creating a task assignment 2492 that allows the single one of the entities to perform an integrity verification 2494.

25. The method of ANY one of the above method clauses, comprising:

using one or more of the apportionments in a probabilistic selection of a single one the entities in creating a task assignment requested by the single one of the entities to have an integrity verification 2494 performed on behalf of the single one of the entities.

26. The method of ANY one of the above method clauses, wherein the transitional interval 1688, 1988 is longer than a week.

27. The method of ANY one of the above method clauses, wherein at least one determinant of each of the rates 1707 is a logarithmic function 1552 of or other nonlinear component 1555 of the inventory 1708 that implements the cumulative incremental attenuation 2455.

28. The method of ANY one of the above method clauses, comprising accepting an expenditure of a special-purpose cryptographic utility token 382 from the first utility token inventory 1708 in response to the first entity 10 transmitting a request for an execution of a first smart contract, wherein the expenditure is conditional upon the request 1045 being granted and wherein the special-purpose cryptographic utility token 382 contains an embedded license term defining a stateless smart contract initiation protocol that must be used for the request to be granted.

29. The method of ANY one of the above method clauses, comprising accepting an expenditure of a special-purpose cryptographic utility token 382 from the first utility token inventory 1708 in response to the first entity 10 transmitting a request for an execution of a first smart contract, wherein the expenditure is conditional upon the request 1045 being granted, wherein the special-purpose cryptographic utility token 382 contains an embedded license term defining a stateless smart contract initiation protocol that must be used for the request to be granted, and wherein a Representation State Transfer protocol is used as the smart contract initiation protocol.

30. A security system at least party based on a utility token inventory tenure, the security system comprising:

transistor-based circuitry (e.g. one or more association modules 2231 of transistor-based circuitry 2200) configured to associate a first entity 10 with a first utility token inventory 1708 and a first trustworthiness indication 1676, wherein the first trustworthiness indication is a first apportionment A1 (e.g. see "first" apportionments depicted with reference to FIG. 16, 18, or 21-26);

transistor-based circuitry (e.g. one or more other association modules 2231 of transistor-based circuitry 2200) configured to associate a second entity 10 with a second utility token inventory 1708 and a second trustworthiness indication 1676, wherein the second trustworthiness indication is a second apportionment A2 (e.g. see "second" apportionments depicted with reference to FIG. 16, 19, or 21-26);

transistor-based circuitry (e.g. one or more other association modules 2231 of transistor-based circuitry 2200) configured to associate a third entity 10 with a third utility token inventory 1708 and a third trustworthiness indication 1676, wherein the third trustworthiness indication is a third apportionment A3 (e.g. see "third" apportionments depicted with reference to FIG. 16 or 20-26);

transistor-based circuitry (e.g. one or more auditing modules 2232 or update modules of transistor-based circuitry 2200) configured to allow one or more of the first, second, or third apportionments to shift across a transitional interval 1588, 1988 each at a corresponding rate 1707 (e.g. at a steep trajectory 1677A or a gradual trajectory 1677B, e.g.) correlating with its corresponding utility token inventory 1708 such that even though A1>A3>A2 initially that A1<A3<A2 after the transitional interval 1688, 1988 (e.g. as depicted in FIG. 16 or 19);

transistor-based circuitry (e.g. one or more comparison modules 2233 of transistor-based circuitry 2200) configured to apply one or more trust-indicative qualifying threshold values 937, 1237 (e.g. as depicted in FIG. 9 or 12) each manifesting a corresponding trust level 1637;

transistor-based circuitry (e.g. one or more sequencing modules 2235 of transistor-based circuitry 2200) configured to transmit (an invitation, authorization, disabled control, or other visible expression/humanly observable presentation of) a selectively inclusive outcome 1545 of a decision protocol 1536 conditionally, as an automatic response (at least partly) based on the transitional interval 1588, 1988 being long enough.

31. The system of ANY one of the above system clauses, wherein the selectively inclusive outcome 1545 of the decision protocol 1536 comprises a digital invitation 1541 (at least) to the second entity.

32. The system of ANY one of the above system clauses, wherein the selectively inclusive outcome 1545 of the decision protocol 1536 comprises a humanly observable presentation of an invitation 1541 to the second entity.

33. The system of ANY one of the above system clauses, comprising:

transistor-based circuitry (e.g. one or more comparison modules of transistor-based circuitry 2200) configured to transmit an (invitation 1541 or other) authorization notification 1543 for the second entity 10 to originate a content thread 1530 (in a restricted forum) as a conditional response to a comparison between the second apportionment 1576 and an original-content-thread-qualifying threshold 1537A indicating that the second entity 10 has more than the original-content-thread-qualifying trust level 1637 at a time 1682 when one or more of the other entities 10 are less trusted than the second entity.

34. The system of ANY one of the above system clauses, comprising:

transistor-based circuitry (e.g. one or more comparison modules of transistor-based circuitry 2200) configured to transmit an authorization notification 1543 for the third entity 10 to post a thread reply in a content thread 1530 (in a restricted forum) as a conditional response to a comparison between the third apportionment 1576 and a thread-reply-qualifying threshold 1537C indicating that the third entity 10 has more than the thread-reply-qualifying trust level 1637 after the transitional interval at a time when the third entity 10 is trusted enough to post the thread reply but not enough to post any graphic images (e.g. when the third entity 10 is trusted more than the thread-reply-qualifying trust level TL but less than the graphic-image-qualifying trust level GL in the example of FIG. 25).

35. The method of ANY one of the above method clauses, comprising:

transistor-based circuitry (e.g. one or more other modules of circuitry 2200) configured to transmit an invitation 1541 or other authorization notification 1543 for the second entity 10 to originate a content thread 1530 (in a restricted forum) as a conditional response to a comparison between the second apportionment 1576 and an original-content-thread-qualifying threshold 1537A indicating that the second entity 10 has more than the original-content-thread-qualifying trust level OL at a time when one or more of the other entities are less trusted than the second entity E2.

36. The method of ANY one of the above method clauses, comprising:

transistor-based circuitry (e.g. one or more other modules of circuitry 2200) configured to transmit an invitation 1541 or other authorization notification 1543 for the third entity 10 to post a thread reply in a content thread 1530 (in a restricted forum) as a conditional response to a comparison between the third apportionment 1576 and a thread-reply-qualifying threshold 1537C indicating that the third entity 10 has more than the thread-reply-qualifying trust level TL after the transitional interval at a time when the third entity 10 is trusted enough to post the thread reply but not enough to post any graphic images (e.g. when the third entity 10 is trusted more than the thread-reply-qualifying trust level TL but less than the graphic-image-qualifying trust level GL).

37. The method of ANY one of the above method clauses, comprising:

transistor-based circuitry (e.g. one or more other association modules 2231 of transistor-based circuitry 2200) configured to associate a fourth entity 10 with a fourth utility token inventory 1708 and a fourth trustworthiness indication 1676, wherein the fourth trustworthiness indication is a fourth apportionment A4 (e.g. see "fourth" apportionments depicted with reference to FIG. 7-8, 15-16, or 25); and transistor-based circuitry (e.g. one or more other association modules 2231 of transistor-based circuitry 2200) configured to associate a fifth entity 10 with a fifth utility token inventory 1708 and a fifth trustworthiness indication 1676; wherein the fifth trustworthiness indication is a fifth apportionment A5 (e.g. see "fifth" apportionments depicted with reference to FIG. 7-8, 15-16, or 25);

transistor-based circuitry (e.g. one or more other modules of circuitry 2200) configured to transmit an invitation 1541 or other authorization notification 1543 for the fourth entity 10 to post a graphic image in a content thread 1530 (in a restricted forum) as a conditional response to a comparison between the fourth apportionment 1576 and a graphic-image-qualifying threshold 1537D indicating that the fourth entity 10 has more than the graphic-image-qualifying trust level GL after the transitional interval at a time when the fourth entity 10 is trusted enough to post the graphic image but not enough to post any user-activatable links (e.g. when the fourth entity 10 is trusted more than the graphic-image-qualifying trust level GL but less than the user-activatable-link-qualifying trust level LL).

38. The method of ANY one of the above method clauses, comprising:

transistor-based circuitry (e.g. one or more other association modules 2231 of transistor-based circuitry 2200) configured to associate a fourth entity 10 with a fourth utility token inventory 1708 and a fourth trustworthiness indication 1676, wherein the fourth trustworthiness indication is a fourth apportionment A4 (e.g. see "fourth" apportionments depicted with reference to FIG. 7-8, 15-16, or 25); and transistor-based circuitry (e.g. one or more other association modules 2231 of transistor-based circuitry 2200) configured to associate a fifth entity 10 with a fifth utility token inventory 1708 and a fifth trustworthiness indication 1676; wherein the fifth trustworthiness indication is a fifth apportionment A5 (e.g. see "fifth" apportionments depicted with reference to FIG. 7-8, 15-16, or 25);

transistor-based circuitry (e.g. one or more other modules of circuitry 2200) configured to transmit an invitation 1541 or other authorization notification 1543 for the fifth entity 10 to post a user-activatable-link in a content thread 1530 (in a restricted forum) as a conditional response to a comparison between the fifth apportionment 1576 and a user-activatable-link-qualifying threshold 1537B indicating that the fifth entity 10 has more than the user-activatable-link-qualifying trust level OL after the transitional interval at a time when the fifth entity 10 is trusted enough to post the user-activatable-link but not enough to originate any content thread (e.g. when the fifth entity 10 is trusted more than the user-activatable-link-qualifying trust level LL but less than the original-content-thread-qualifying trust level OL).

39. The system of ANY one of the above system clauses, comprising:

transistor-based circuitry (e.g. one or more other association modules 2231 of transistor-based circuitry 2200) configured to associate a fourth entity 10 with a fourth utility token inventory 1708 and a fourth trustworthiness indication 1676, wherein the fourth trustworthiness indication is a fourth apportionment A4 (e.g. see "fourth" apportionments depicted with reference to FIG. 7-8, 15-16, or 25); and transistor-based circuitry (e.g. one or more other association modules 2231 of transistor-based circuitry 2200) configured to associate a fifth entity 10 with a fifth utility token inventory 1708 and a fifth trustworthiness indication 1676; wherein the fifth trustworthiness indication is a fifth apportionment A5 (e.g. see "fifth" apportionments depicted with reference to FIG. 7-8, 15-16, or 25); wherein A1<A3<A4<A5<A2 at a particular instant of time 1682 after the transitional interval 1688, 1988; wherein the automatic response is also (partly) based on the transitional interval 1588, 1988 not being long enough for the first entity to become qualified (such as by the first entity becoming or remaining untrusted during the transitional interval 1588, 1988) but wherein the transitional interval 1588, 1988 is "long enough" insofar that it is long enough for the second entity to become qualified (such as by apportionment A2 manifesting a large stake-based trustworthiness over time and thereby shifting across one or more qualifying thresholds 1537 during the transitional interval 1588, 1988).

40. The system of ANY one of the above system clauses, wherein at least one of the one or more trust-indicative qualifying threshold values 937, 1237 manifests a corresponding trust level 1637 corresponds to a selected one of a first original-content-thread-qualifying threshold 1637A, to a first user-activatable-link-qualifying threshold 1637B, to a first thread-reply-qualifying threshold 1637C, or to a first graphic-image-qualifying threshold 1637D.

41. The system of ANY one of the above system clauses, wherein the one or more trust-indicative qualifying threshold values 937, 1237 include an original-content-thread-qualifying threshold 1637A corresponding to an original-content-thread-qualifying trust level 1637.

42. The system of ANY one of the above system clauses, wherein the one or more trust-indicative qualifying threshold values 937, 1237 include a user-activatable-link-qualifying threshold 1637B corresponding to a user-activatable-link-qualifying trust level 1637.

43. The system of ANY one of the above system clauses, wherein the one or more trust-indicative qualifying threshold values 937, 1237 include a graphic-image-qualifying threshold 1637D corresponding to a graphic-image-qualifying trust level 1637.

44. The system of ANY one of the above system clauses, wherein the one or more trust-indicative qualifying threshold values 937, 1237 include a thread-reply-qualifying threshold 1637C corresponding to a thread-reply-qualifying trust level 1637.

45. The system of ANY one of the above system clauses, wherein the transitional interval 1588, 1988 is more than a week.

46. A distributed public ledger interaction system comprising:

transistor-based circuitry (e.g. one or more sequencing modules 1331 of transistor-based circuitry 1300) configured to record one or more (device-executable code components 630, service version identifiers 641, terms version identifiers 642, or other) elements 685B of a first version 631 of a first smart contract (e.g. comprising an instance of device-executable code component 630) privately (e.g. on one or more secure servers 500B) on a first private ledger node (e.g. node 180); and transistor-based circuitry (e.g. one or more sequencing modules 1332) configured to execute the first version 631 of the first smart contract (e.g. 1) so as to retrieve first public ledger node data (e.g. comprising one or more elements 685A of block 677A) in a first public ledger node (e.g. comprising a public blockchain or other distributed ledger node 170) by executing the first version 631 of the first smart contract using one or more parameters 634 that identify both the first public ledger node (e.g. node 170) and the first public ledger node data (e.g. comprising elements 685A) to be retrieved and (e.g. 2) so as to configure a second smart contract (e.g. comprising another instance of device-executable code component 630) to include a first transaction that is partly based on the first public ledger node data from the first public ledger node (e.g. particular elements 685A of node 170) and partly based on a first attribute of a public ledger destination (e.g. an address of node 170 or format requirement of node 190) and (3) so as to implement the first transaction of the second smart contract partly based on the first public ledger node data from the first public ledger node and partly based on the public ledger destination.

47. The system of Clause 46, wherein all of the transistor-based circuitry 1300 is implemented on a single application-specific integrated circuit (ASIC).

48. The system of Clause 46, wherein the transistor-based circuitry 1300 is distributed across two or more mutually remote facilities.

49. The system of Clause 46, wherein the public ledger destination identifies the first public ledger node.

50. The system of Clause 46, wherein the public ledger destination identifies a second public ledger node.

51. The system of ANY one of the above system clauses, wherein the transistor-based circuitry configured to execute the first version 631 of the first smart contract comprises:

transistor-based circuitry configured to condition an execution of the first version 631 of the first smart contract upon a first trustworthiness indication (e.g. a score 633 along a trajectory that generally increases with time) reaching an execution trust requirement (e.g. a threshold 1237), wherein a first entity is associated with the execution trust requirement upon a completion of a first temporal interval that depends upon a utility token balance 748 of the first entity during the first temporal interval 1291, wherein a second entity is associated with the execution trust requirement upon a completion of a second temporal interval that depends upon a utility token balance 748 of the second entity during the second temporal interval 1292, wherein a third entity is associated with the execution trust requirement upon a completion of a third temporal interval 1293 that depends upon a utility token balance 748 of the third entity during the third temporal interval, and wherein all of the temporal intervals 1291-1293 are negatively correlated with the utility token balances (e.g. each to a corresponding one of the utility token balances so as to associate steeper trust increases with larger token balances).

52. The system of ANY one of the above system clauses, wherein the transistor-based circuitry configured to execute the first version 631 of the first smart contract comprises:

transistor-based circuitry configured to condition an execution of the first version 631 of the first smart contract upon a first trustworthiness indication (e.g. score 747 or score 855) reaching a threshold value 937 wherein a first entity (e.g. identified as "VIKESFAN21") achieves an execution trust requirement in a first temporal interval 1291 (having a duration that is) negatively correlated with a utility token balance 748 of the first entity during the first temporal interval 1291, wherein negative correlation signifies that a second entity is associated with the execution trust requirement in a second temporal interval 1292 that is longer than the first temporal interval 1291 because the second entity has had a lower utility token balance 748 than the utility token balance 748 of the first entity during the first temporal interval 1291, and wherein a third entity is associated with the execution trust requirement in a third temporal interval 1293 that is shorter than the first temporal interval 1291 because the third entity has had a higher utility token balance 748 than the utility token balance 748 of the first entity during the first temporal interval 1291.

53. The system of ANY one of the above system clauses, wherein the transistor-based circuitry configured to execute the first version 631 of the first smart contract comprises:

transistor-based circuitry configured to condition an availability notification 1070 of the first version 631 of the first smart contract upon a first trustworthiness indication wherein the first version 631 achieves an availability notification trust requirement (e.g. a threshold 1237) in a first temporal interval 1291 negatively correlated with a utility token balance 748 (e.g. wherein an aggregate balance decreasing tends to lengthen the time interval in a stepwise or monotonic fashion) of a source 741 of the first version 631 during the first temporal interval 1291.

54. The system of ANY one of the above system clauses, wherein the private ledger node resides on one or more private servers 500B of a private or hybrid-private network 620 wherein one or more (instances of) application-type code components 630 are configured to be initiated only by an expenditure of one or more special-purpose utility tokens 382 (e.g. Dragon™ tokens as described below).

55. The system of ANY one of the above system clauses, wherein the private ledger node 180 resides on one or more private servers 500B wherein one or more (instances of) application-type code components 630 are configured to be initiated only by an expenditure of one or more special-purpose utility tokens 382 and wherein at least one of the one or more special-purpose utility tokens 382 includes a first embedded license term in a smart contract codifying one or more requirements that a request 1045 must fulfill before a particular service 1050 identified by the request may be accessed.

56. The system of ANY one of the above system clauses, wherein the private ledger node resides on one or more private servers 500B configured so that one or more (e.g. instances of) code components 630 are impossible for a particular user (e.g. a member or other entity 10B) to initiate directly through any payment tokens (e.g. Bitcoin or similar cryptocurrencies) but in which the particular user can initiate (an execution of) at least one of the one or more code components 630 by expending some number of special-purpose utility tokens 382 (e.g. Dragon™ tokens as described below) owned by the particular user.

57. The system of ANY one of the above system clauses, wherein the one or more elements 685B of the first version 631 of the first smart contract comprise a movement of one or more special-purpose utility tokens 382 (e.g. a purchase to or expenditure from a digital wallet 366 or other inventory of a single private entity).

58. The system of ANY one of the above system clauses, wherein the one or more elements 685B of the first version 631 of the first smart contract are recorded "privately" insofar that a complete copy of the first private ledger node resides on a network 620 that is owned by a single private entity.

59. The system of ANY one of the above system clauses, wherein the one or more elements 685B of the first version 631 of the first smart contract are recorded "privately" insofar that the first public ledger node (e.g. node 170) and the first private ledger node (node 180) are separated by a firewall 189.

60. The system of ANY one of the above system clauses, further comprising:

a physical article implementing a digital wallet 366 configured to receive one or more special-purpose utility tokens 382 upon an execution of the second smart contract.

61. The system of ANY one of the above system clauses, further comprising:

a physical article implementing a digital wallet 366 that includes crypto assets 373 (e.g. utility tokens or cryptocurrency) that can later be used by an owner of the digital wallet 366.

62. The system of ANY one of the above system clauses, wherein the transistor-based circuitry configured to execute the first version 631 of the first smart contract causes one or more processors 502 (when executing the first version 631) to transmit the first transaction of the second smart contract to the second public ledger node 190, wherein the first public ledger node data includes a first service version identifier 641 (e.g. becoming a service version 1.7 by virtue of one or more elements 685A in block 677A), and wherein the prior public ledger node data includes a prior service version identifier 641 (having been a service version 1.5 just before block 677D and service version 1.6 by virtue of one or more elements 685A in block 677D).

63. The system of ANY one of the above system clauses, wherein the transistor-based circuitry configured to execute the first version 631 of the first smart contract causes one or more processors 502 (when executing the first version 631) to transmit the first transaction of the second smart contract to the second public ledger node, wherein the first public ledger node data includes a first termset version identifier 642 (e.g. becoming a termset version 4.45 by virtue of one or more elements 685A in block 677A) and wherein the prior public ledger node data includes a prior termset version identifier 642 (e.g. updating from termset version 4.2 to termset version 4.3 by including an element 685A of 4.3 in a transaction of a new block 677C).

64. The system of ANY one of the above system clauses, wherein the transistor-based circuitry configured to execute the first version 631 of the first smart contract causes one or more processors 502 (when executing the first version 631) to transmit the first transaction of the second smart contract to the second public ledger node, wherein the first public ledger node data includes a first service version identifier 641 and a first termset version identifier 642 and wherein the prior public ledger node data includes a prior service version identifier 641 and a prior termset version identifier 642.

65. The system of System Clause 1, wherein the transistor-based circuitry configured to execute the first version 631 of the first smart contract comprises:

transistor-based circuitry (e.g. as an instance of special-purpose circuitry 522) configured to execute the first version 631 of the first smart contract so as to retrieve the first public ledger node data in the first public ledger node so as to detect a first parametric update (e.g. one or more versions 631 or other elements 685A of blocks 677 changing) therein relative to prior public ledger node data (e.g. as shown in FIG. 6).

66. The system of ANY one of the above system clauses, wherein the transistor-based circuitry 1300 is also configured to perform one or more methods described below.

67. A distributed public ledger interaction method comprising:

invoking transistor-based circuitry (e.g. one or more sequencing modules 1331) configured to record one or more (device-executable code components 630, service version identifiers 641, terms version identifiers 642, or other) elements 685B of a first version 631 of a first smart contract (e.g. comprising an instance of device-executable code component 630) privately (e.g. on one or more secure servers 500B) on a first private ledger node (e.g. node 180); and invoking transistor-based circuitry (e.g. one or more sequencing modules 1332) configured to execute the first version 631 of the first smart contract (e.g. 1) so as to retrieve first public ledger node data (e.g. comprising one or more elements 685A of block 677A) in a first public ledger node (e.g. comprising a public blockchain or other distributed ledger node 170) by executing the first version 631 of the first smart contract using one or more parameters 634 that identify both the first public ledger node (e.g. node 170) and the first public ledger node data (e.g. comprising elements 685A) to be retrieved and (2) so as to configure a second smart contract 625 (e.g. comprising a data-transformative instruction set or some other instance of a device-executable code component 630) to include a first transaction that is partly based on the first public ledger node data from the first public ledger node (e.g. particular elements 685A of node 170) and partly based on a first attribute of a public ledger destination (e.g. an address of node 170 or format requirement of node 190) and (3) so as to implement the first transaction of the second smart contract partly based on the first public ledger node data from the first public ledger node and partly based on the public ledger destination.

68. The method of Clause 67, wherein the public ledger destination identifies the first public ledger node.

69. The method of Clause 67, wherein the public ledger destination identifies a second public ledger node.

70. The method of Clause 67, wherein the distributed ledger destination implements a serverless architecture blockchain platform (e.g. as described below in Appendix B).

71. The method of Clause 67, wherein the public ledger destination identifies (at least) the first public ledger node and a second public ledger node.

72. The method of ANY one of the above method clauses, wherein the private ledger node 180 resides on one or more private servers 500B wherein one or more (instances of) application-type code components 630 are configured to be initiated only by an expenditure of one or more special-purpose utility tokens 382.

73. The method of ANY one of the above method clauses, wherein at least one of the one or more special-purpose utility tokens 382 determine one or more elements 685B (e.g. an embedded license term defining a request format or smart contract initiation protocol) that a request 1045 must contain before a particular service 1050 identified by the request may be received.

74. The method of ANY one of the above method clauses, wherein the invoking transistor-based circuitry configured to execute the first version 631 of the first smart contract comprises (at least) iteratively monitoring one or more public nodes 170 for one or more requester-specified phenomena of interest, wherein the one or more requester-specified phenomena of interest include first and second asset transfers from a requester-specified digital wallet 366 with a frequency of occurrence that exceeds a requester-specified frequency threshold.

75. The method of ANY one of the above method clauses, wherein the first private ledger node resides on one or more private servers 500 configured so that one or more (e.g. instances of) code components 630 are impossible for a particular entity 10B to invoke (e.g. trigger an execution of) directly through any payment token (e.g. plentiful Bitcoin owned by the particular entity 10B and available) but in which the particular entity 10B can initiate (an execution of) at least one of the one or more code components 630 by expending some number of special-purpose utility tokens 382 (e.g. a quantity of "Dragons" as described below) owned by the particular entity 10B.

76. The method of ANY one of the above method clauses, wherein the second smart contract 625 is a data-transformative instruction set.

77. The method of ANY one of the above method clauses, wherein the second smart contract 625 contains a special-purpose license that is maintained on the public ledger destination via a consensus-based distributed authentication protocol (e.g. in a block of a blockchain), wherein the special-purpose license is configured to control access to another (instance of) code component 630.

78. The method of ANY one of the above method clauses, wherein the public ledger destination maintains a rights provenance for a particular execution of the first smart contract (e.g. as version identifiers or other elements 685A).

79. The method of ANY one of the above method clauses, wherein the one or more elements 685B of the first version 631 of the first smart contract comprise a movement of one or more special-purpose utility tokens 382 (e.g. a purchase to or expenditure from a digital wallet 366 or other inventory of a single private entity).

80. The method of ANY one of the above method clauses, wherein the invoking transistor-based circuitry configured to execute the first version 631 of the first smart contract comprises:
 transmitting a result of the first transaction of the second smart contract (e.g. transaction 241) partly based on the first public ledger node data from the first public ledger node and partly based on the public ledger destination being implemented to one or more mining rig nodes 400G-H.

81. The method of ANY one of the above method clauses, wherein the invoking transistor-based circuitry configured to execute the first version 631 of the first smart contract comprises:
 accepting an expenditure of a utility token 382 belonging to an entity 10B who transmitted a request 1045 for an execution of the first smart contract that is conditional upon the request 1045 being granted, wherein the utility token 382 contains an embedded license term defining a smart contract initiation protocol that must be used for the request 1045 to be granted.

82. The method of ANY one of the above method clauses, wherein the invoking transistor-based circuitry configured to execute the first version 631 of the first smart contract comprises:
 accepting an expenditure of a utility token 382 belonging to an entity 10B who transmitted a request 1045 for an execution of the first smart contract that is conditional upon the request 1045 being granted, wherein the utility token 382 contains an embedded license term defining a smart contract initiation protocol that includes a particular request format that must be used for the request 1045 to be granted.

83. The method of ANY one of the above method clauses, wherein the invoking transistor-based circuitry configured to execute the first version 631 of the first smart contract comprises:
 accepting an expenditure of a utility token 382 belonging to an entity 10B who transmitted a request 1045 for an execution of the first smart contract that is conditional upon the request 1045 being granted, wherein the utility token 382 contains an embedded license term defining a smart contract initiation protocol that must be used for the request 1045 to be granted, and wherein a stateless protocol is used as the smart contract initiation protocol.

84. The method of ANY one of the above method clauses, wherein the invoking transistor-based circuitry configured to execute the first version 631 of the first smart contract comprises:
 accepting an expenditure of a utility token 382 belonging to an entity 10B who transmitted a request 1045 for an execution of the first smart contract that is conditional upon the request 1045 being granted, wherein the utility token 382 contains an embedded license term defining a smart contract initiation protocol that must be used for the request 1045 to be granted, and wherein a Representation State Transfer protocol is used as the smart contract initiation protocol.

85. The method of ANY one of the above method clauses, wherein the invoking transistor-based circuitry configured to execute the first version 631 of the first smart contract comprises:
 iteratively monitoring one or more public nodes 170 for one or more requester-specified phenomena of interest, wherein the one or more requester-specified phenomena of interest include first and second asset transfers from a requester-specified digital wallet 366.

86. The method of ANY one of the above method clauses, wherein the invoking transistor-based circuitry configured to execute the first version 631 of the first smart contract comprises:
 iteratively monitoring one or more public nodes 170 for one or more requester-specified phenomena of interest, wherein the one or more requester-specified phenomena of interest include first and second asset transfers from a requester-specified digital wallet 366 with a frequency of occurrence that exceeds a requester-specified frequency threshold.

87. The method of ANY one of the above method clauses, wherein the first private ledger node 180 resides on one or more private servers 500B wherein one or more (instances of) application-type code components 630 are configured to be initiated only by an expenditure of one or more special-purpose utility tokens 382 (and not by any conventional cryptocurrency).

88. The method of ANY one of the above method clauses, wherein the first private ledger node 180 resides on one or more private servers 500B wherein one or more (instances of) application-type code components 630 are configured to be initiated only by an expenditure of one or more special-purpose utility tokens 382 (and not by any conventional cryptocurrency).

89. The method of ANY one of the above method clauses, wherein the invoking the transistor-based circuitry configured to record the one or more elements 685B of the first version 631 of the first smart contract comprises:

recording an entirety of the first version 631 of the first smart contract with metadata describing the first version 631 of the first smart contract all in a single block of the first private ledger node 170, wherein the metadata includes an alphanumeric identifier 632 of the first smart contract, wherein the metadata includes a then-current score 633 of the first smart contract, wherein the metadata includes a natural language description of one or more parameters 634 with which the first smart contract may be executed, and wherein the metadata includes a required tier 742 or other quantification that a requester must satisfy to be eligible to initiate an execution of the first smart contract.

90. The method of ANY one of the above method clauses, wherein the invoking transistor-based circuitry configured to execute the first version 631 of the first smart contract comprises:

iteratively executing the first transaction of the second smart contract on an ongoing periodic basis.

91. The method of ANY one of the above method clauses, wherein the invoking transistor-based circuitry configured to execute the first version 631 of the first smart contract comprises:

iteratively executing the first transaction of the second smart contract on an ongoing periodic basis with a frequency greater than once per week.

92. The method of ANY one of the above method clauses, wherein the invoking transistor-based circuitry configured to execute the first version 631 of the first smart contract comprises:

iteratively executing the first transaction of the second smart contract on an ongoing periodic basis with a frequency greater than once per day.

93. The method of ANY one of the above method clauses, wherein the invoking transistor-based circuitry configured to execute the first version 631 of the first smart contract comprises:

iteratively monitoring one or more public nodes 170, 190 for one or more requester-specified phenomena of interest.

94. The method of ANY one of the above method clauses, wherein the invoking transistor-based circuitry configured to execute the first version 631 of the first smart contract comprises:

iteratively monitoring one or more public nodes 170, 190 for one or more requester-specified phenomena of interest, wherein the one or more requester-specified phenomena of interest include a transaction pertaining to a requester-specified digital wallet 366.

95. The method of ANY one of the above method clauses, wherein the invoking transistor-based circuitry configured to execute the first version 631 of the first smart contract comprises:

iteratively monitoring one or more public nodes 170, 190 for one or more requester-specified phenomena of interest, wherein the one or more requester-specified phenomena of interest include first and second asset transfers from a requester-specified digital wallet 366.

96. The method of ANY one of the above method clauses, wherein the invoking transistor-based circuitry configured to execute the first version 631 of the first smart contract comprises:

iteratively monitoring one or more public nodes 170, 190 for one or more requester-specified phenomena of interest, wherein the one or more requester-specified phenomena of interest include first and second asset transfers from a requester-specified digital wallet 366 with a frequency of occurrence that exceeds a requester-specified frequency threshold (e.g. daily).

97. The method of ANY one of the above method clauses, wherein a Dragon™ token as described below is used as a utility token 382 so as to invoke (an execution of) the first version 631 of the first smart contract.

98. The method of ANY one of the above method clauses, wherein a Dragon™ token as described below is used as a utility token 382 so as to invoke (at least) the first transaction of the second smart contract.

99. The method of ANY one of the above method clauses, wherein each expenditure of one or more utility tokens 382 by an entity 10A who supplies the first smart contract increases a time interval 991, 1291 until that entity obtains an eligibility 745, 746.

100. The method of ANY one of the above method clauses, wherein each expenditure of one or more utility tokens 382 by an entity 10B who requests a service 1050 that includes executing the first smart contract increases a time interval 991, 1291 until that entity obtains an eligibility 745, 746.

101. The method of ANY one of the above method clauses, wherein each expenditure of one or more utility tokens 382 by an entity 10A who supplies a (code component 630 or other) content component 640 increases a time interval 991, 1291 until the content component 640 obtains an eligibility (e.g. becoming associated with an affirmative Boolean indication of suitability 856).

102. The method of ANY one of the above method clauses, further comprising:

implementing an interchain interaction system 100 like that depicted in FIG. 1.

103. The method of ANY one of the above method clauses, further comprising:

transmitting a result of the second smart contract to a cryptographically secured handheld digital wallet 366 like that of FIG. 3.

104. The method of ANY one of the above method clauses, further comprising:

implementing an interchain interaction system having smart contracts 625 and other shared resources 650 like those depicted in FIG. 6.

105. The method of ANY one of the above method clauses, further comprising:

implementing an interchain interaction system using a media-resident record list 700 like that of FIG. 7 to characterize respective human entities 10.

106. The method of ANY one of the above method clauses, further comprising:

implementing an interchain interaction system using a media-resident record list 800 like that of FIG. 8 to characterize respective version-controlled types of code components 630.

107. The method of ANY one of the above method clauses, further comprising:

implementing a conditional notification 1070 to an entity 10B who has requested and received a service 1050 as depicted in FIG. 10.

108. The method of ANY one of the above method clauses, further comprising:

implementing a conditional notification 1070 like that of FIG. 10.

109. The method of ANY one of the above method clauses, further comprising:

implementing a scoring system to imbue an entity 10B who has requested and received a service 1050 with an accelerating evaluation of trustworthiness (concave up, as shown) as depicted in trajectory 962 of FIG. 9.

110. The method of ANY one of the above method clauses, further comprising:

implementing a scoring system to imbue an entity 10A (e.g. the entity who supplied the code component as depicted in FIGS. 11-12) with an evaluation of trustworthiness (e.g. quantified as a current score 855 or other apportionment 1801-1803, 2181-2183) growing with time 1805 at a (net effective nominal) rate 1707 that depends upon a cryptographic utility token inventory 1708 of the entity 10A.

111. The method of ANY one of the above method clauses, further comprising:

implementing a scoring system to imbue a code component 630 with an evaluation of trustworthiness (e.g. quantified as a current score 855) growing with time at a (net effective nominal) rate 1707 that depends upon a token balance 748 of an entity 10A who supplied the code component as depicted in FIGS. 11-12.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A security method at least party based on a cryptographic utility token inventory tenure, said security method comprising:

associating a first entity with a first cryptographic utility token inventory and a first trustworthiness indication, wherein said first trustworthiness indication is a first apportionment A1;

associating a second entity with a second cryptographic utility token inventory and a second trustworthiness indication, wherein said second trustworthiness indication is a second apportionment A2;

associating a third entity with a third cryptographic utility token inventory and a third trustworthiness indication, wherein said third trustworthiness indication is a third apportionment A3;

associating a fourth entity with a fourth cryptographic utility token inventory and a fourth trustworthiness indication, wherein said fourth trustworthiness indication is a fourth apportionment A4;

associating a fifth entity with a fifth cryptographic utility token inventory and a fifth trustworthiness indication, wherein said fifth trustworthiness indication is a fifth apportionment A5;

allowing one or more of said first, second, or third apportionments to shift across a transitional interval each at a corresponding rate correlating with its corresponding cryptographic utility token inventory such that even though A1>A3>A2 initially that A1<A3<A4<A5<A2 after said transitional interval;

applying one or more trust-indicative qualifying threshold values each manifesting a corresponding trust level;

automatically transmitting a selectively inclusive outcome of a decision protocol as a conditional response based on said transitional interval being long enough for said second entity to become qualified to post particular content in a particular restricted forum;

accepting an expenditure of some of said first cryptographic utility token inventory in response to said first entity transmitting a request for an execution of a first smart contract, wherein said expenditure is conditional upon said request being granted and wherein said first cryptographic utility token inventory contains an embedded license term defining a stateless smart contract initiation protocol that must be used for said request to be granted; and triggering said execution of said first smart contract.

2. The security method of claim 1, comprising:

using one or more of said apportionments in a probabilistic selection of a single one said entities in creating a task assignment that allows said single one of said entities to perform an integrity verification.

3. The security method of claim 1, comprising:

using one or more of said apportionments in a probabilistic selection of a single one said entities in creating a task assignment requested by said single one of said entities to have an integrity verification performed on behalf of said single one of said entities.

4. The security method of claim 1, comprising:

transmitting an invitation for at least one of said entities to participate in a beta software release as an automatic and conditional response to a determination that a corresponding one of said apportionments has reached or exceeded a beta software release participation threshold, wherein said one or more trust-indicative qualifying threshold values includes said beta software release participation threshold; and transmitting software access authorization data as a conditional response to a reply indicating that said invitation has been accepted.

5. The security method of claim 1, wherein triggering said execution of said first smart contract comprises:

recording one or more elements of a first version of said first smart contract privately on a first cryptographically authenticatable node in response to said first entity transmitting a request for said execution of said first smart contract; and executing said first version of said first smart contract so as to retrieve first cryptographically authenticatable node data in a first cryptographically authenticatable node by executing said first version of said first smart contract using one or more parameters that identify both said first cryptographically authenticatable node and said first cryptographically authenticatable node data to be retrieved and so as to configure a second smart contract to include a first transaction that is partly based on said first cryptographically authenticatable node data from said first cryptographically authenticatable node and partly based on a first attribute of a distributed ledger destination and so as to implement said first transaction of said second smart contract partly based on said first cryptographically authenticatable node data from said first cryptographically authenticatable node and partly based on said distributed ledger destination, wherein said distributed ledger destination identifies said first cryptographically authenticatable node.

6. The security method of claim 1, wherein triggering said execution of said first smart contract comprises:
recording one or more elements of a first version of said first smart contract privately on a first cryptographically authenticatable node in response to said first entity transmitting a request for said execution of said first smart contract; and
executing said first version of said first smart contract so as to retrieve first cryptographically authenticatable node data in a first cryptographically authenticatable node by executing said first version of said first smart contract using one or more parameters that identify both said first cryptographically authenticatable node and said first cryptographically authenticatable node data to be retrieved and so as to configure a second smart contract to include a first transaction that is partly based on said first cryptographically authenticatable node data from said first cryptographically authenticatable node and partly based on a first attribute of a distributed ledger destination and so as to implement said first transaction of said second smart contract partly based on said first cryptographically authenticatable node data from said first cryptographically authenticatable node and partly based on said distributed ledger destination, wherein said distributed ledger destination identifies a second cryptographically authenticatable node.

7. The security method of claim 1, comprising:
iteratively monitoring one or more public nodes for one or more requester-specified phenomena of interest by another entity, wherein said one or more requester-specified phenomena of interest include first and second asset transfers from a requester-specified digital wallet; and
transmitting to one or more mining rig nodes a result of said first transaction of said second smart contract partly based on said first cryptographically authenticatable node data from said first cryptographically authenticatable node and partly based on said distributed ledger destination being implemented.

8. The security method of claim 1, wherein a Representation State Transfer (REST) protocol is used as said stateless smart contract initiation protocol.

9. The security method of claim 1, further comprising:
transmitting a result of said second contract to a cryptographically secured handheld digital wallet configured to receive at least a fraction of said special-purpose cryptographic utility token.

10. The transistor-based distributed ledger interaction method of claim 1, comprising:
in response to a request by said first entity, executing a second smart contract iteratively monitoring one or more public nodes for one or more requester-specified phenomena of interest by iteratively executing a first transaction of a smart contract on an ongoing basis with a median frequency greater than once per week, wherein said one or more requester-specified phenomena of interest include any transaction pertaining to a requester-specified digital wallet.

11. The security method of claim 1, wherein an expenditure of at least a fraction of a cryptographic utility token by said third entity who thereby requests a service that includes executing said first smart contract increases a time interval until said third entity obtains an eligibility.

12. The security method of claim 1, comprising:
invoking transistor-based circuitry configured to execute a first version of said first smart contract as a conditional response to a first trustworthiness indication reaching an execution trust requirement, wherein said first entity is associated with said execution trust requirement upon a completion of a first temporal interval that depends upon a cryptographic utility token balance of said first inventory during said first temporal interval, wherein said second entity is associated with said execution trust requirement upon a completion of a second temporal interval that depends upon a cryptographic utility token balance of said second inventory during said second temporal interval, wherein a third entity is associated with said execution trust requirement upon a completion of a third temporal interval that depends upon a cryptographic utility token balance of said third inventory during said third temporal interval, and wherein all of said temporal intervals correlate negatively with said cryptographic utility token balances with a correlation coefficient having a magnitude greater than 0.6.

13. The security method of claim 1, wherein said transitional interval is longer than a week and wherein at least one determinant of each of said rates is a logarithmic function of said inventory that implements said cumulative incremental attenuation.

14. The security method of claim 1, comprising:
implementing a staircase-type transfer function that exhibits a substantial correlation between numerous rates and a corresponding one of numerous cryptographic utility token inventories wherein said rates each affect a corresponding one of numerous apportionments that include all of said apportionments, wherein said numerous cryptographic utility token inventories include all of said cryptographic utility token inventories, and wherein said rates and said inventories collectively exhibit a Pearson product-moment correlation coefficient with a magnitude greater than 0.99.

15. A security system at least party based on a cryptographic utility token inventory tenure, said security system comprising:
transistor-based circuitry configured to associate a first entity with a first cryptographic utility token inventory and a first trustworthiness indication, wherein said first trustworthiness indication is a first apportionment A1;
transistor-based circuitry configured to associate a second entity with a second cryptographic utility token inventory and a second trustworthiness indication, wherein said second trustworthiness indication is a second apportionment A2;
transistor-based circuitry configured to associate a third entity with a third cryptographic utility token inventory and a third trustworthiness indication, wherein said third trustworthiness indication is a third apportionment A3;
transistor-based circuitry configured to allow one or more of said first, second, or third apportionments to shift across a transitional interval each at a corresponding rate correlating with its corresponding cryptographic utility token inventory such that even though A1>A3>A2 initially that A1<A3<A2 after said transitional interval;
transistor-based circuitry configured to apply one or more trust-indicative qualifying threshold values each manifesting a corresponding trust level;
transistor-based circuitry configured to transmit a selectively inclusive outcome of a decision protocol as an automatic and conditional response based on said transitional interval being long enough for said second entity to become qualified to post particular content in a restricted forum;

transistor-based circuitry configured to accept some of said first cryptographic utility token inventory in response to said first entity transmitting a request for an execution of a first smart contract; and transistor-based circuitry configured to trigger said execution of said first smart contract on one or more processors.

16. A security method at least party based on a cryptographic utility token inventory tenure, said security method comprising:

associating a first entity with a first cryptographic utility token inventory and a first trustworthiness indication, wherein said first trustworthiness indication is a first apportionment A1;

associating a second entity with a second cryptographic utility token inventory and a second trustworthiness indication, wherein said second trustworthiness indication is a second apportionment A2;

associating a third entity with a third cryptographic utility token inventory and a third trustworthiness indication, wherein said third trustworthiness indication is a third apportionment A3;

allowing one or more of said first, second, or third apportionments to shift across a transitional interval each at a corresponding rate correlating with its corresponding cryptographic utility token inventory such that even though A1>A3>A2 initially that A1<A3<A2 after said transitional interval;

applying one or more trust-indicative qualifying threshold values each manifesting a corresponding trust level;

transmitting a selectively inclusive outcome of a decision protocol as an automatic and conditional response based on said transitional interval being long enough for said second entity to become qualified to post particular content in a restricted forum;

accepting at least some of some of said first cryptographic utility token inventory in response to said first entity transmitting a request for an execution of a first smart contract; and triggering said execution of said first smart contract on one or more processors.

17. The security method of claim 16, comprising:

implementing a staircase-type transfer function that exhibits a correlation between numerous rates and a corresponding one of numerous cryptographic utility token inventories wherein said rates each affect a corresponding one of numerous apportionments that include said first, second, and third apportionments, wherein said numerous cryptographic utility token inventories include all of said cryptographic utility token inventories, and wherein said rates and said inventories collectively exhibit a Pearson product-moment correlation coefficient with a magnitude greater than 0.6.

* * * * *